(12) United States Patent
Morellec et al.

(10) Patent No.: US 10,580,316 B2
(45) Date of Patent: *Mar. 3, 2020

(54) SYSTEM FOR CONTROLLING A LATERAL PATH OF AN AIRCRAFT INCLUDING A RUDDER BAR

(71) Applicant: DASSAULT AVIATION, Paris (FR)

(72) Inventors: Olivier Morellec, Saint Aubin (FR); François Salmon-Legagneur, Paris (FR)

(73) Assignee: DASSAULT AVIATION, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,799

(22) Filed: Oct. 23, 2018

(65) Prior Publication Data

US 2019/0122572 A1    Apr. 25, 2019

(30) Foreign Application Priority Data

Oct. 24, 2017 (FR) ...................................... 17 01106

(51) Int. Cl.
| | |
|---|---|
| *G08B 21/00* | (2006.01) |
| *G08G 5/06* | (2006.01) |
| *B64C 25/50* | (2006.01) |
| *G05D 1/02* | (2020.01) |
| *B64C 25/34* | (2006.01) |
| *B64D 43/00* | (2006.01) |

(52) U.S. Cl.
CPC ............. *G08G 5/065* (2013.01); *B64C 25/50* (2013.01); *G05D 1/0202* (2013.01); *B64C 25/34* (2013.01); *B64D 43/00* (2013.01)

(58) Field of Classification Search
None
See application file for complete search history.

(56) References Cited

U.S. PATENT DOCUMENTS

| | | | | |
|---|---|---|---|---|
| 4,482,961 A | * | 11/1984 | Kilner ................. | G05D 1/0083 244/183 |
| 9,047,771 B1 | * | 6/2015 | Thoreen .............. | G08G 5/0021 |
| 2007/0241935 A1 | * | 10/2007 | Pepitone ............. | G05D 1/0083 340/958 |

FOREIGN PATENT DOCUMENTS

EP            0780747 A2    6/1997

OTHER PUBLICATIONS

Search report for priority application FR1701106.

* cited by examiner

*Primary Examiner* — Adolf Dsouza
(74) *Attorney, Agent, or Firm* — Davidson, Davidson & Kappel, LLC

(57) ABSTRACT

A system for controlling a trajectory of an aircraft on the ground, includes a determining module configured to determine a current trajectory of the aircraft on the ground including a series of waypoints planned for an element of the aircraft with unchanged conditions of the lateral movement devices of the aircraft, and at least one limit trajectory, including a series of limit waypoints that may be reached by the element by actuating at least one lateral movement device. The system includes a display assembly comprising a viewer configured to display a view (200) of a runway portion located near the aircraft, and a display generating module configured to display, on the viewer, a current trajectory curve (202) representative of the current trajectory and at least one limit curve (204a, 204b, 206a, 206b) representative of the limit trajectory, superimposed on the view (200).

20 Claims, 10 Drawing Sheets

SYSTEM FOR CONTROLLING A LATERAL PATH OF AN AIRCRAFT INCLUDING A RUDDER BAR

The present disclosure relates to a system for controlling a trajectory of an aircraft rolling on a runway, the aircraft including lateral movement devices able to be actuated to change a lateral trajectory of the aircraft.

BACKGROUND

The driving of an aircraft on the ground, and in particular the control of the aircraft around its yaw axis, is generally provided by controlling the steering angle of the nose gear wheel, by the orientation of the rudder, and in addition by a differential braking assembly able to exert a braking differential between a left main landing gear and the right main landing gear to generate the yaw movement. The control of the aircraft around its yaw axis may further be done using electric motors driving the wheels of the main landing gear, at different speeds and/or by applying a thrust differential between the left engine and the right engine.

Various control means are known to command these different lateral movement devices.

In particular, some aircraft include three separate control means each acting on one of the aforementioned lateral movement devices. These control means for example consist of a tiller, a rudder bar and independent brake pedals.

The tiller is a control wheel whose rotation makes it possible to cause a corresponding modification of the steering angle of the wheel.

The rudder bar is intended to control the rudder. In particular, the rudder bar generally includes a left pedal, the movement of which is intended to control a left turn, and a right pedal, the movement of which is intended to control a right turn.

The brake pedals include a left brake pedal and a right brake pedal, the actuation of which is intended to command braking of the left or right main landing gear, respectively, therefore a turn to the left or to the right, respectively.

The brake pedals are for example mounted on the rudder bar. Thus, each rudder bar pedal is movable along a first degree of freedom, for example in translation, associated with a command of the rudder, and along a second degree of freedom, for example in rotation around an axis orthogonal to the translation direction of the pedal, associated with a command of the differential braking assembly.

Nevertheless, the guiding of an aircraft on a runway may prove delicate, in particular due to the presence of obstacles (buildings, vehicles, other aircraft, etc.) on the runway, the variable adhesion state of the latter and encountered weather conditions (crosswind, for example).

To assist the pilot in guiding the aircraft on the ground, it is known from document U.S. Pat. No. 7,592,929 to display, on a viewer, a depiction of the runway on which an element is superimposed depicting the current lateral trajectory of the aircraft.

SUMMARY OF THE INVENTION

Nevertheless, this solution is not fully satisfactory, in particular because it does not allow the pilot to determine whether a desired future trajectory, other than the current trajectory, for example to avoid an obstacle, can be achieved.

One aim of the present disclosure therefore consists of providing a system for controlling a lateral trajectory of an aircraft allowing the pilot to obtain a synthetic view of the potential trajectories that the aircraft may follow and the different control devices able to be implemented to follow these trajectories.

A control system of the aforementioned type is provided, characterized in that the control system includes a module for determining ground trajectories of the aircraft, configured to determine, at least at one moment:
 a current trajectory of the aircraft on the ground, including a series of waypoints planned for at least one element of the aircraft, under unchanged conditions of the lateral movement devices,
 at least one limit trajectory, including a series of limit waypoints that may be reached by the element of the aircraft by actuating at least one lateral movement device, and in that the control system includes a display assembly comprising:
 a viewer, configured to display a view of a runway portion located near the aircraft;
 a display generating module, configured to display, on the viewer, a current trajectory curve representative of said current trajectory and at least one limit curve representative of the limit trajectory, said curves being superimposed on the view of the portion of the runway.

The control system according to the invention may comprise one or more of the following features, considered alone or according to any technically possible combination:
 the lateral movement devices include:
  a first set of lateral movement devices including a steerable nose gear wheel, and
  a differential braking assembly, configured to generate a movement of the aircraft around a yaw axis in an active state, to the exclusion of a nonactive state.
 the first set of lateral movement devices includes a rudder.
 the determining module is configured to determine, at said moment:
  at least one first limit trajectory, including a series of first limit waypoints able to be reached by the element of the aircraft by actuating at least one lateral movement device of the first set, the differential braking assembly being in the nonactive state, and/or
  at least one second limit trajectory, including a series of second limit waypoints able to be reached by the element of the aircraft by actuating at least one lateral movement device of the first set and the differential braking assembly, the differential braking assembly being active.
 the display generating module is configured to display, on the viewer:
  at least one first limit curve representative of the first limit trajectory, said first limit curve being superimposed on the view of the portion of the runway, and/or
  at least one second limit curve representative of the second limit trajectory, said second limit curve being superimposed on the view of the portion of the runway.
 the determining module is configured to determine:
  two first limit trajectories, including a first left limit trajectory associated with a yaw movement in a first direction, and a first right limit trajectory, associated with a yaw movement in a second direction, opposite the first direction,
  two second limit trajectories, including a second left limit trajectory associated with a yaw movement in the first direction, and a second right limit trajectory, associated with a yaw movement in the second direction.

the display generating module is configured to display, on the viewer:
a first left limit curve representative of the first left limit trajectory and/or a first right limit curve representative of the first right limit trajectory, and
a second left limit curve representative of the second left limit trajectory and/or a second right limit curve representative of the second right limit trajectory.

the display generating module is configured to display, selectively on the viewer:
at least one of the first and second left limit curves if the current trajectory is oriented in the first direction, or
at least one of the first and second right limit curves if the current trajectory is oriented in the second direction.

the display generating module is configured to display, on the viewer, at least one of the first and second left, respectively right limit curves, if the current trajectory is oriented in the first direction, respectively in the second direction, and one of the following conditions is met:
the absolute value of the yaw angle of the aircraft being increasing, the current trajectory is such that the yaw angle is greater in absolute value than a left, respectively right display threshold yaw angle,
the absolute value of the yaw angle of the aircraft being decreasing, the current trajectory is such that the yaw angle is greater in absolute value than a left, respectively right erasure threshold yaw angle, said left, respectively right erasure threshold yaw angle being less in absolute value than the left, respectively right display threshold yaw angle.

the current trajectory curve and each limit curve are representative of the current trajectory and each limit trajectory, respectively, over variable preset respective distances, and the display generating module is configured to determine said distances as a function of a piece of current speed information of the aircraft.

the display generating assembly is configured to display, on the viewer, the current trajectory curve and each limit curve when a speed of the aircraft is between a preset minimum bound and maximum bound, and to eliminate, from the viewer, the current trajectory curve and each limit curve when the speed of the aircraft is below the minimum bound or above the maximum bound.

the or each element of the aircraft is chosen from among the nose gear wheel, a nose of the aircraft, an end of a left wing of the aircraft, an end of a right wing of the aircraft and the tail of the aircraft.

the viewer includes a head-up viewer of the aircraft, chosen from among a semitransparent monitor intended to be placed in front of the windshield of a cockpit of the aircraft or to be worn by the pilot and a system for projecting images on the windshield of the cockpit, and/or a head-down monitor integrated into a dashboard of a cockpit of the aircraft.

the view of the runway portion includes an egocentric view of the runway portion, seen from a viewpoint located in the cockpit of the aircraft, and/or an exocentric view of the runway portion, seen from a viewpoint located outside the aircraft.

the view of the runway portion is an actual view of the runway portion.

the view of the runway portion is a synthetic depiction of the runway portion, and the display generating module is configured to generate said depiction from a current position of the aircraft on the runway and a topographical database stored in a memory and/or images of the runway entered by a camera.

A method for controlling a trajectory of an aircraft rolling on a runway is also provided, the aircraft including lateral movement devices able to be actuated to change a lateral trajectory of the aircraft, the method including the following steps:

determining a current trajectory of the aircraft on the ground, said current trajectory including a series of waypoints planned for at least one element of the aircraft, under unchanged conditions of the movement devices, determining at least one limit trajectory, including a series of first limit waypoints that may be reached by the element of the aircraft by actuating at least one lateral movement device, displaying, on a viewer, a view of a runway portion located near the aircraft;

displaying, on a viewer, a current trajectory curve representative of the current trajectory and at least one limit curve representative of the limit trajectory, said curves being superimposed on the view of the portion of the runway.

According to one embodiment, the lateral movement devices include:
a first set of lateral movement devices including a steerable nose gear wheel, and
a differential braking assembly, configured to generate a movement of the aircraft around a yaw axis in an active state, to the exclusion of a nonactive state,
the step for determining at least one limit trajectory includes:
determining at least a first limit trajectory, including a series of first limit waypoints able to be reached by the element of the aircraft by actuating at least one lateral movement device of the first assembly, the differential braking assembly being in the nonactive state, and/or determining at least one second limit trajectory, including a series of second limit waypoints able to be reached by the element of the aircraft by actuating at least one lateral movement device of the first set and the differential braking assembly, the differential braking assembly being active,
and the display includes displaying at least one first limit curve representative of the first limit trajectory, said first limit curve being superimposed on the view of the portion of the runway, and/or at least one second limit curve representative of the second limit trajectory, said second limit curve being superimposed on the view of the second portion of the runway.

Preferably, the first set of lateral movement devices includes a rudder of the aircraft.

BRIEF SUMMARY OF THE DRAWINGS

The invention will be better understood upon reading the following description, provided solely as an example and done in reference to the appended drawings, in which.

DETAILED DESCRIPTION

Figure 1:
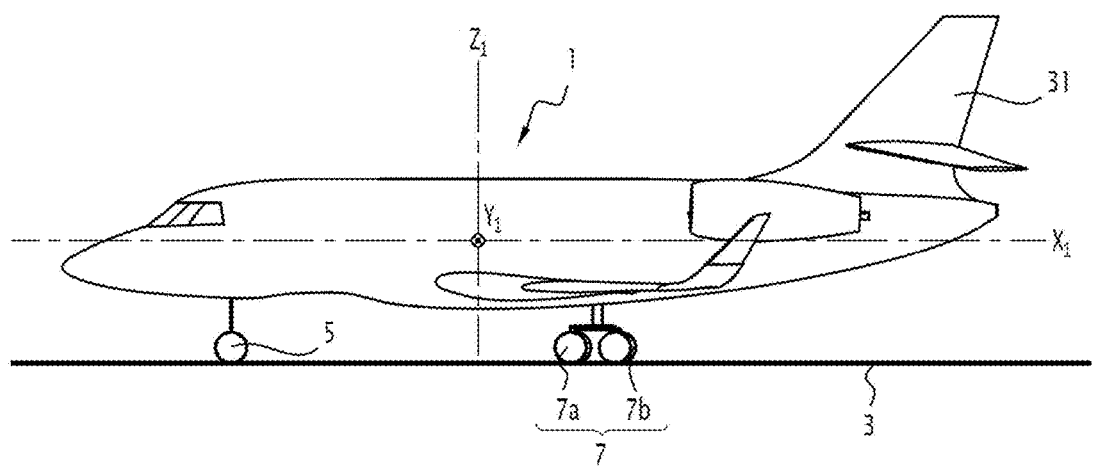
FIG. 1 schematically shows an aircraft including a control system according to one embodiment.

FIG. 1 shows an aircraft 1 rolling on the ground on a runway 3. The aircraft 1 is mobile in a longitudinal direction and around a yaw axis $Z_1$-$Z_1$.

FIG. 1 also shows the roll axis $\lambda_1$-$\lambda_1$ of the aircraft 1 and the pitch axis $Y_1$-$Y_1$ of the aircraft 1.

Hereinafter, "longitudinal" will refer to an axis or a direction parallel to the direction of elongation of the aircraft 1.

The yaw axis $Z_1$-$Z_1$ is an axis orthogonal to the longitudinal direction, contained in the plane of symmetry of the aircraft 1 and passing through the center of gravity of the aircraft 1.

By extension, "vertical" will refer to an axis or a direction parallel to the yaw axis $Z_1$-$Z_1$.

Furthermore, "lateral" will refer to an axis or a direction orthogonal to the yaw axis $Z_1$-$Z_1$ and the longitudinal direction.

Moreover, "longitudinal plane" will refer to a plane orthogonal to the yaw axis $Z_1$-$Z_1$, and "vertical plane" to a plane orthogonal to the longitudinal plane.

The aircraft 1 is able to move, at each moment, along a ground speed vector Vs. The projection of this speed vector Vs over a plane orthogonal to the yaw axis $Z_1$-$Z_1$ forms, with the longitudinal direction of the aircraft, an angle referred to hereinafter as yaw angle $\lambda$.

Hereinafter, "angle" will refer to an angle oriented in the counterclockwise direction seen from above.

The aircraft 1 includes a nose gear 5, referred to hereinafter as nose gear wheel, and a main landing gear 7 comprising a left main landing gear 7a and a right main landing gear 7b. Typically, the nose gear 5, the left main landing gear 7a and the right main landing gear 7b each include two wheels.

The nose gear wheel 5 and the main landing gear 7 are in contact with the runway 3 when the aircraft 1 moves on the ground on the runway.

Figure 2:
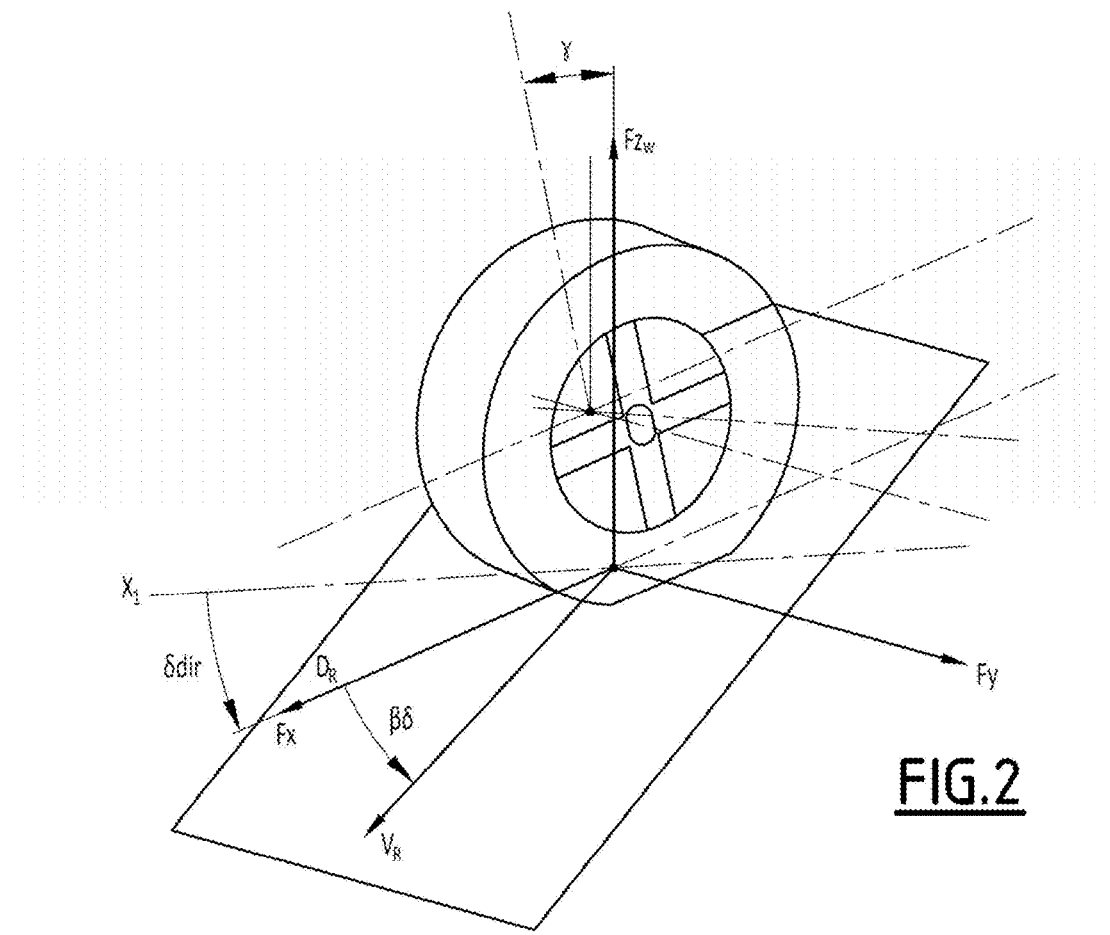
FIG. 2 schematically shows a nose gear wheel of the aircraft of FIG. 1.

The nose gear wheel 5 is able to roll in a front rolling direction $D_R$, and to move, in a longitudinal plane, according to a wheel speed vector $V_R$ (FIG. 2). The front rolling direction $D_R$ forms, with the longitudinal direction of the aircraft, an angle $\delta_{dr}$ referred to hereinafter as "steering angle".

The front rolling direction $D_R$ further forms, with the wheel speed vector $V_R$, a nose gear sideslip angle denoted 13B (FIG. 2). The nose gear sideslip angle 13B is nil when the front rolling direction is parallel to the wheel speed vector $V_R$.

The nose gear wheel 5 is symmetrical along a vertical plane parallel to the rolling direction, hereinafter called "plane of the nose gear wheel".

The nose gear wheel 5 is rotatable around a vertical axis. The nose gear wheel 5 is further steerable. In particular, the nose gear wheel 5 is provided with a steering device 9 of the wheel 5, configured to change the steering angle $\delta_{dr}$ of the wheel 5.

The left 7a and right 7b main landing gears are each stationary relative to the aircraft 1.

The left 7a and right 7b main landing gears are able to roll along a main rolling direction. The main rolling direction forms, with the ground speed vector Vs of the aircraft, a main landing gear sideslip angle 13T.

The aircraft 1 includes longitudinal movement devices 11 and lateral movement devices 13.

Figure 3:
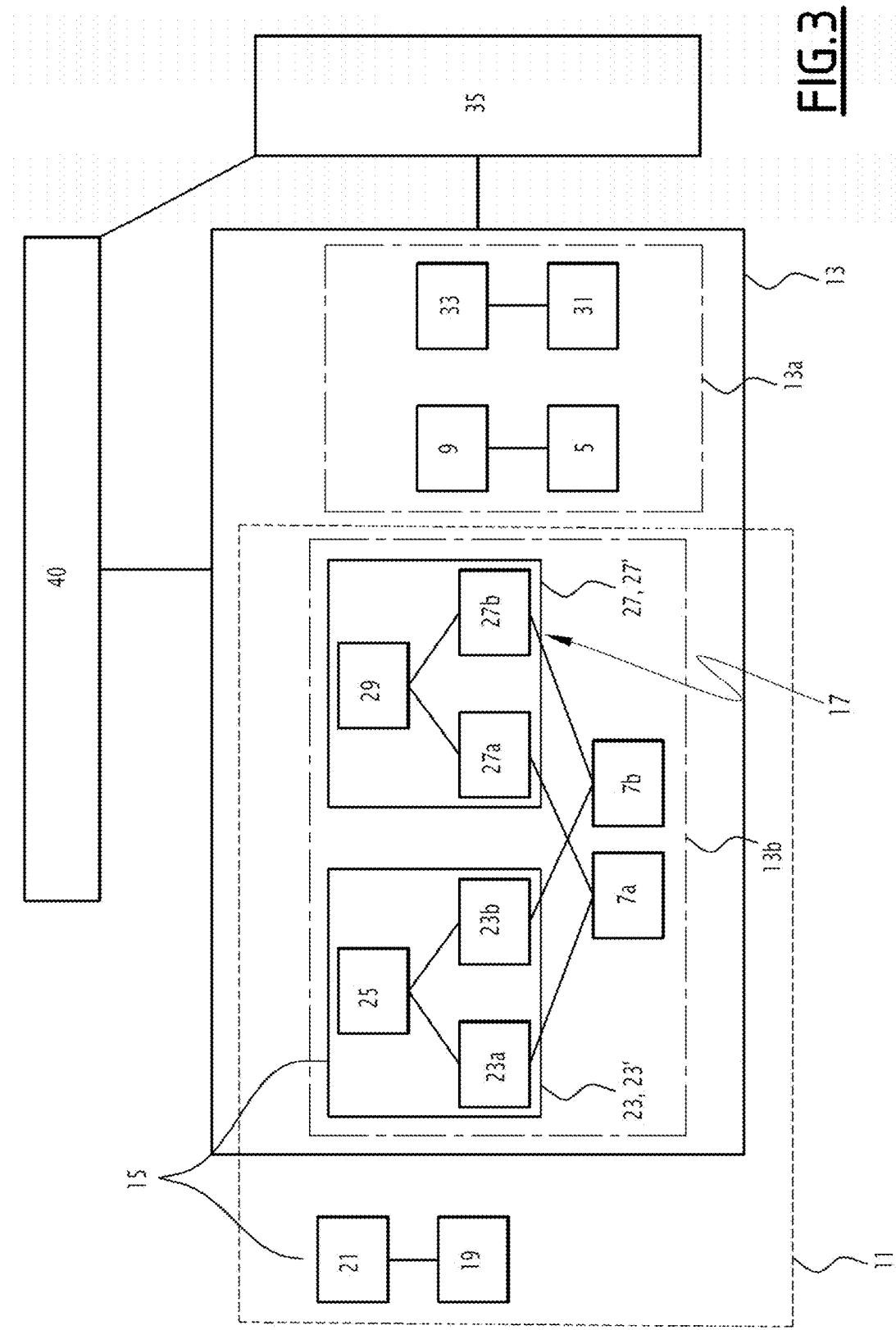
FIG. 3 is a diagram illustrating the movement devices of the aircraft of FIG. 1 and the control means of these devices.

These movement devices are illustrated schematically in FIG. 3.

The longitudinal movement devices 11 are intended to control the movement of the aircraft 1 on the ground along the longitudinal direction of the aircraft. The lateral movement devices 13 are intended to control the movement of the aircraft on the ground along a lateral direction, around the yaw axis $Z_1$-$Z_1$.

The longitudinal movement devices 11 are able to exert a longitudinal force on the aircraft, oriented toward the front or rear of the aircraft 1, to drive a movement of the aircraft along the longitudinal direction of the aircraft or to oppose such a movement.

Typically, the longitudinal movement devices include a motor assembly 15 and braking devices 17.

The motor assembly 15 for example includes motors 19 able to exert a thrust force on the aircraft 5, such as reactors, turboprops or turbines, and a device 21 for controlling the motors 19. For example, the motors 19 include a left motor and a right motor.

According to one embodiment, the motor assembly 15 further includes a set of electric motors 23 able to drive the movement of the main landing gear 7, provided with a device 25 for controlling these electric motors.

The set of electric motors 23 in particular includes a left electric motor 23a capable of moving the left main landing gear 7a, and a right electric motor 23b, capable of moving the right main landing gear 7b.

The device 25 for controlling the electric motors is configured to command the left electric motor 23a and the right electric motor 23b symmetrically, so as to drive the movement of the left main landing gear 7a according to a left main landing gear speed VTa and to drive the movement of the right main landing gear 7b according to a right main landing gear speed VTb=VTa, and thus to generate a longitudinal movement of the aircraft.

The braking devices 17 include a braking assembly 27 of the main landing gear, provided with a control device 29.

The braking assembly 27 includes a braking device 27 of the left main landing gear and a braking device 27b of the right main landing gear.

The control device 29 is configured to command the braking devices 27a, 27b symmetrically so as to exert, on the left main landing gear 7a and the right main landing gear 7b, a same force FTa=FTb opposing the movement of the left 7a and right 7a main landing gears and thus to generate a longitudinal force opposing the longitudinal movement of the aircraft.

The lateral movement devices 13 are configured to set the aircraft 1 in motion around the yaw axis $Z_1$-$Z_1$, according to a positive angle (i.e., to the left) or a negative angle (i.e., to the right).

The lateral movement devices 13 are thus configured to modify the lateral trajectory of the aircraft, i.e., the trajectory of the aircraft along a direction orthogonal to the roll axis X1-X1 of the aircraft.

In particular, the movement devices are configured to modify the yaw angle $\lambda$ of the aircraft.

Hereinafter, "lateral movement" will refer to a movement around the yaw axis $Z_1$-$Z_1$, combined with a movement in the longitudinal direction.

The lateral movement devices 13 are able to be actuated, i.e., have at least one operating parameter able to be modified to generate a movement of the aircraft 1 around the yaw axis $Z_1$-$Z_1$.

An actuation of a lateral movement device 13 therefore includes changing an operating parameter of said device capable of modifying the lateral trajectory of the aircraft, for example capable of modifying the curve radius of said trajectory and the yaw angle $\lambda$ of the aircraft.

The lateral movement devices 13 include first 13a and second 13b sets of lateral movement devices.

The first set 13a in particular includes the device 9 for steering the wheel 5, capable of changing the steering angle $\delta$dir of the nose gear wheel 5 in order to modify the lateral trajectory of the aircraft.

The first set 13a further includes a steerable rudder 31, provided with a steering device 33. The steering device 33 is able to change the orientation $\delta$n of the rudder 31 to modify the lateral trajectory of the aircraft.

The second set 13b includes the braking assembly 27, commanded by the control device 29 of the braking assembly.

Indeed, the control device 29 of the braking assembly is configured to command the braking device 27a of the left main landing gear and the braking device 27b of the right main landing gear asymmetrically, so as to exert a non-nil force differential $\Delta F$ between the left 7a and right 7b main landing gears, and thus to set the aircraft 1 in motion around the yaw axis, in order to modify its lateral trajectory.

In particular, the control device 29 of the braking assembly is configured to command the braking device 27a of the left main landing gear 7a and the braking device 27b of the right main landing gear 7b, so as to exert, at a given moment, on the left main landing gear 7a, a left braking force FTa', and to exert, on the right main landing gear 7b, a right braking force FTb'=FTa'+/−$\Delta F$.

Such asymmetrical braking is able to cause the aircraft 1 to move around the yaw axis in a positive direction (when FTa'>FTb') or in a negative direction (when FTb'<FTb').

For example, one of the braking forces FTa' or FTb' is nil.

The braking assembly 27, when implemented to generate a lateral movement, will hereinafter be called differential braking assembly 27'.

The differential braking assembly 27' may be active or inactive.

In the active state, the differential braking assembly 27' is able to generate a lateral movement of the aircraft 1.

Indeed, in the active state, the differential braking assembly 27' is capable of exerting a distinct left braking force and right braking force, i.e., a non-nil differential force $\Delta F$ between the left 7a and right 7b main landing gears, so as to generate the lateral movement of the aircraft 1.

In the inactive state, the differential braking assembly 27' is capable of exerting only an equal left braking force and right braking force, optionally nil, and therefore does not generate any lateral movement of the aircraft 1.

The differential braking assembly 27' is able to be activated, i.e., configured in the active state, or deactivated, i.e., configured in the inactive state.

According to one particular embodiment, the second assembly 13b further includes the set of electric motors 23, controlled by the control device 25 of the electric motors.

Indeed, the control device 25 of the motors is configured to command the left electric motor 23a and the right electric motor 23b asymmetrically so as to apply a speed differential $\Delta VT$ between the left 7a and right 7b main landing gears, and thus to set the aircraft 1 in motion around the yaw axis.

Thus, the device 25 for controlling the motors is configured to command, at a given moment, the left electric motor 23a so as to drive the movement of the left main landing gear 7a according to a left main landing gear speed VTa' and the right electric motor 23b so as to drive the movement of the right main landing gear 7b according to a right main landing gear speed VTb'=VTa'+/−$\Delta VT$.

The set of electric motors 23, when implemented to generate a lateral movement, will hereinafter be called differential motor assembly 23'.

The differential motor assembly 23' may be active or inactive.

In the active state, the differential motor assembly 23' drives the motion of the left 7a and right 7b main landing gears according to a left main landing gear speed VTa and a right main landing gear speed VTb≠VTa that are different, so as to generate a lateral movement of the aircraft 1.

In the inactive state, the differential motor assembly 23' drives the motion of the left 7a and right 7b main landing gears according to equal speeds, and therefore does not generate any lateral movement of the aircraft 1.

According to an alternative that is not shown, the second assembly 13b further includes the motor assembly 15. Indeed, the control device 21 of the motors 19 is configured to command the left motor and the right motor asymmetrically so as to apply a thrust differential between the left and right motors, and thus to set the aircraft 1 in motion around the yaw axis.

Hereinafter, actuating a lateral movement device will refer to changing at least one setting of said device, for example changing the steering angle of the nose gear wheel 5, the orientation of the rudder 31, applying a given force differential between the left main landing gear 7a and the right main landing gear 7b, or applying a speed differential between the left main landing gear 7a and the right main landing gear 7b.

The aircraft 1 further includes an assembly 35 for determining parameters relative to the movement of the aircraft on the ground.

These parameters include a current position of the aircraft 1 on the runway, as well as parameters relative to the movement of the aircraft 1, in particular:

the ground speed vector $V_S$ of the aircraft (hereinafter ground speed vector) as well as the components Vx, Vy and Vz of the speed vector $V_S$ in a local land coordinate system ($\lambda_0$, $Y_0$, $Z_0$);

the modulus $|V_S|$ of this speed vector;

the yaw speed r of the aircraft, i.e., the angular movement speed of the aircraft around its yaw axis Z;

the orientation of the axes of the aircraft relative to the local land coordinate system, i.e., the angle $\varphi$ between the pitch axis $Y_1$-$Y_1$ of the aircraft 1 and the horizontal reference plane $\lambda_0$-$Y_0$ of the land coordinate system, the angle $\theta$ between the roll axis $\lambda_1$-$\lambda_1$ of the aircraft 1 and the horizontal reference plane $\lambda_0$-$Y_0$, and the angle $\psi$ between the roll axis $\lambda_1$-$\lambda_1$ of the aircraft 1 and the vertical reference plane $\lambda_0$-$Z_0$ of the land coordinate system;

the lateral acceleration of the aircraft ay;

a sideslip angle βkp of the aircraft 1 at least at one point P of the aircraft 1.

To that end, the determining assembly 35 for example includes a geographical position sensor, such as a satellite position sensor, for example a GPS sensor and an inertial unit.

These parameters further include operating parameters of the aircraft 1.

In particular, the determining assembly 35 is configured to determine an operating state of the nose gear wheel 5, and to detect any failure or malfunction of the nose gear wheel 5 that may prevent the control of the steering angle of the nose gear wheel 5. In case of failure, the nose gear wheel 5 generally rotates freely, but its steering angle may no longer be commanded by the orientation device 9.

The determining assembly 35 is also configured to determine the current temperature of the braking devices 27a, 27b.

According to one embodiment, these parameters may include estimated environmental parameters, in particular a runway state (for example dry, wet or icy runway).

These parameters further include a current state of the lateral movement devices, in particular:

A current steering angle δdir of the nose gear wheel 5,

A current orientation angle on of the rudder 31,

A braking command differential between the left 7a and right 7b main landing gears, A speed command differential of the electric motors 23a, 23b between the left and right main landing gears, A thrust command differential between the left and right motors.

Figure 4:
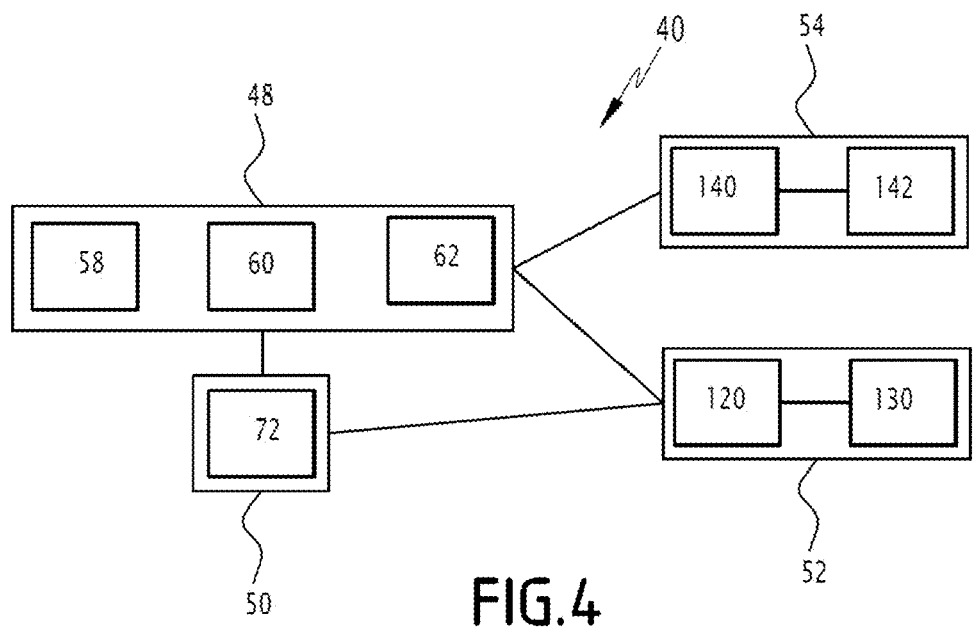
FIG. 4 is a diagram of a control system according to one embodiment of the invention.

The aircraft 1 is provided with a system 40 for controlling the lateral trajectory of the aircraft 1 on the ground, one embodiment of which is illustrated schematically in FIG. 4.

The control system 40 is configured to acquire a lateral trajectory order, and to control the lateral movement devices 13 such that the aircraft 1 follows the acquired lateral trajectory.

A lateral trajectory refers to a trajectory described by at least one point or element of the aircraft 1, combining a longitudinal movement and a lateral movement.

The considered point or element of the aircraft 1 is for example the center of gravity of the aircraft 1, the nose of the aircraft 1, the nose gear wheel 5, the end of the wing this or the tail of the aircraft 1.

A lateral trajectory is characterized, at each point of said trajectory, by a lateral movement direction (i.e., to the left or to the right), and by at least one lateral trajectory parameter, for example:

a curve radius ρ, preferably associated with speed information at that point, in particular the modulus $|V_s|$ of the speed vector at that point, and/or a yaw speed r at that point.

The control system 40 is further configured to determine a current trajectory of the aircraft and limit trajectories achievable by the aircraft, and to command the display of said trajectories on a viewer, intended for the pilot.

To that end, the control system 40 includes several modules, grouped together hereinafter into functional assemblies.

In particular, the control system 40 includes a regulating assembly 48, a command assembly 50 of the lateral trajectory, a control assembly 52 of the lateral trajectory, and a display assembly 54.

The regulating assembly 48 is configured to determine regulating parameters of the lateral movement devices 13.

In particular, the regulating assembly 48 is configured to determine a steering angle range of the nose gear wheel, denoted [$\delta dir_{min}$; $\delta dir_{max}$], outside which a risk of loss of adhesion of the nose gear wheel 5 is significantly increased.

The regulating assembly 48 is further intended to regulate the use of the differential braking assembly 27', in particular to determine an activation threshold of the differential braking assembly 27', in particular a first limit trajectory from which the differential braking assembly 27' must be activated.

The regulating assembly 48 is further configured to determine a second limit trajectory achievable by the aircraft 1 by using lateral movement devices 13, in particular the differential braking assembly 27'.

The regulating assembly 48 is further able to determine a current trajectory of the aircraft 1.

The command assembly 50 is configured to acquire a lateral trajectory order.

In the illustrated example, the command assembly 50 is configured to acquire a lateral trajectory order, or input or instruction lateral trajectory, entered by a pilot.

Alternatively, the command assembly 50 is configured to acquire a lateral trajectory order generated by an automatic pilot.

The control assembly 52 of the lateral trajectory is configured to control the lateral movement devices 13 such that the aircraft 1 follows an instruction lateral trajectory according to the lateral trajectory order acquired by the command assembly 50.

In particular, the control assembly 52 is configured to determine, from the trajectory order, instruction orders to be applied to one or several of the lateral movement devices 13 so that the aircraft 1 follows the instruction lateral trajectory, and to send these instruction orders to the lateral movement devices 13.

In particular, the control assembly 52 is configured to determine the instruction orders such that the steering angle of the nose gear wheel 5 remains in the steering angle range of the nose gear wheel [$\delta dir_{min}$; $\delta dir_{max}$], beyond which a risk of loss of adhesion of the nose gear wheel 5 is significantly increased.

The display assembly 54 is configured to display, for the pilot, a view of at least one runway portion on which the aircraft moves, as well as a curve representative of the current trajectory of the aircraft 1, and at least one limit curve representative of a limit trajectory able to be achieved by at least one element of the aircraft by actuating at least one lateral movement device, said curves being superimposed on the view of the runway portion.

As described below, the display assembly is for example configured to display a first limit curve representative of the first limit trajectory and a second limit curve representative of the second limit trajectory, superimposed on the view of the runway portion.

In the illustrated embodiment, the regulating assembly 48 includes a module 58 for limiting the steering angle of the nose gear wheel 5.

The regulating assembly 48 further includes a regulating module 60 for the differential braking assembly 27'.

The regulating assembly 48 also includes a module 62 for determining trajectories.

The limiting module 58 is configured to determine the steering angle range of the nose gear wheel, denoted [δdir$_{min}$; δdir$_{max}$], outside which a risk of loss of adhesion of the nose gear wheel 5 is significantly increased.

The limiting module 58 is configured to determine or receive information relative to the current ground speed of the aircraft and at least one maximum authorized sideslip angle of the nose gear wheel 5, denoted βδmax, and/or a maximum authorized sideslip angle of the left and right main landing gears 7a, 7b, denoted βTmax.

The information relative to the current ground speed of the aircraft for example includes the modulus |V$_s$| of the current ground speed vector of the aircraft 1, and the current yaw speed r of the aircraft 1.

The limiting module 58 is in particular configured to receive this speed information from the determining assembly 35.

Preferably, the limiting module 58 is also configured to estimate or receive a parameter representative of a current adhesion state of the runway. This adhesion state is for example a dry state, corresponding to maximum adhesion, a wet state, corresponding to medium adhesion, or an icy state, corresponding to low adhesion. For example, the limiting module 58 is configured to receive this adhesion state parameter from the control tower on the ground.

Preferably, the limiting module 58 is configured to extract the maximum authorized sideslip angle βδmax of the nose gear wheel 5 and, if applicable, the maximum authorized sideslip angle βTmax of the left and right main landing gears 7a, 7b, from a database.

The limiting module 58 thus includes a database of maximum sideslip angles. This database includes predetermined maximum authorized sideslip angle values of the nose gear wheel 5 and/or left 7a and right 7b main landing gears.

The maximum sideslip angle βδmax of the nose gear wheel 5 is the sideslip angle (38 of said wheel 5 beyond which a risk of loss of adhesion of the tire of the wheel 5 is significantly increased.

Preferably, the database includes predetermined maximum authorized sideslip angle values of the nose gear wheel 5 and/or left 7a and right 7b main landing gears as a function of the current runway state.

The maximum sideslip angle βδmax of the nose gear wheel 5 is then preferably the sideslip angle βδ of said wheel 5 beyond which a risk of loss of adhesion of the tire of the wheel 5 is significantly increased in light of the runway state.

Figure 5:
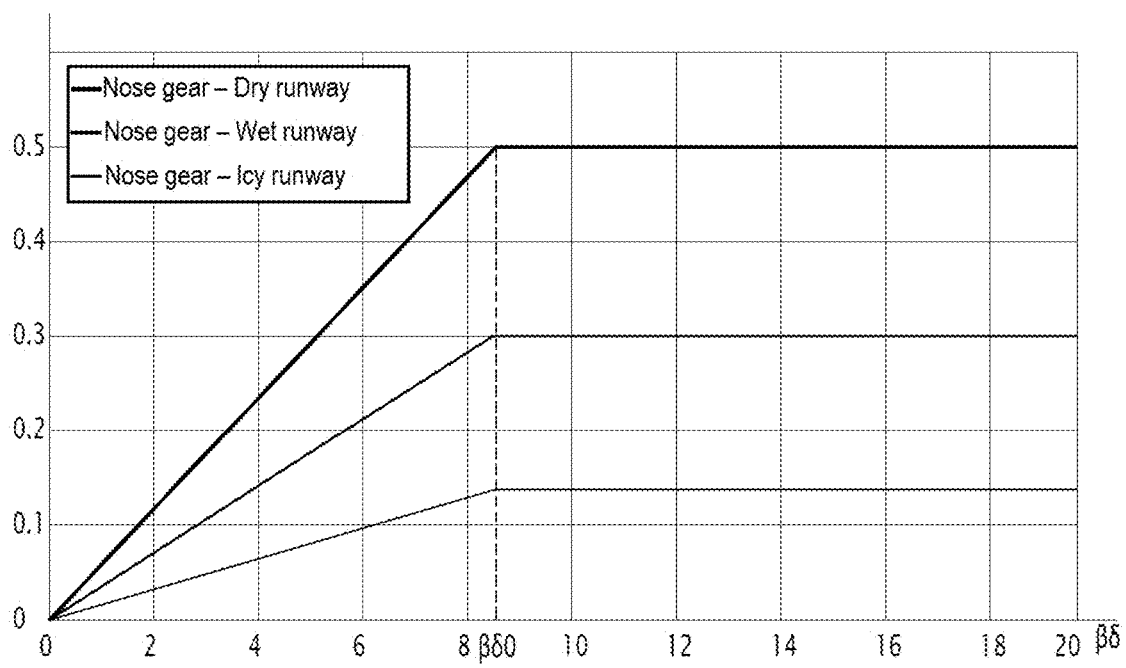
FIG. 5 is a graph schematically illustrating the ratio variation of the lateral force exerted on a nose gear wheel based on the sideslip angle for different runway states and for a given vertical force.

FIG. 5 thus shows the variation of the lateral force coefficient Ky exerted on the nose gear wheel 5 as a function of the sideslip angle βδ, for different runway states (dry, wet or icy runway) and for a given vertical force Fz.

The lateral force Fy exerted on the nose gear wheel 5 may be expressed by:

$$F_y = F_z * K_y(\beta\delta)$$

where F$_z$ is the vertical force and Ky is the lateral force coefficient, which is a function of the sideslip angle βδ.

The slope efficiency or adhesion coefficient μ$_y$ are also defined, corresponding to the drift of the lateral force relative to the sideslip angle:

$$\mu_y(\beta\delta) = \frac{dK_y}{d\beta\delta}(\beta\delta)$$

FIG. 5 shows two successive states:
- a linear state, obtained while the sideslip angle βδ remains below a threshold value βδ$_0$, in which the lateral force coefficient Ky is a substantially linear function of the sideslip angle βδ. In the linear state, the adhesion coefficient μ$_y$ is substantially constant or increasing.
- a downgraded state, obtained when the sideslip angle θ exceeds the threshold value βδ$_0$, in which the lateral force coefficient Ky is no longer a linear function of the sideslip angle. In the illustrated example, the lateral force coefficient Ky is saturated beyond the sideslip angle threshold value, but it may also decrease. In the downgraded state, the adhesion coefficient μ$_y$ is thus a nil or decreasing function of the sideslip angle βδ. When the downgraded state is reached, a risk of loss of adhesion and breaking away of the nose gear wheel 5 exists.

Preferably, the maximum authorized sideslip angle βδmax of the nose gear wheel 5 is equal to the sideslip angle βδ$_0$ threshold value.

Alternatively, the maximum authorized sideslip angle βδmax is below the threshold value, for example between the threshold value βδ$_0$ and 90%*βδ$_0$.

Likewise, the maximum sideslip angle βTmax of the left 7a and right 7b main landing gears is the sideslip angle β of these main landing gears beyond which a risk of loss of adhesion of the tire of the wheel 5 is significantly increased. Preferably, the maximum authorized sideslip angle βδTmax of the left and right main landing gears is equal to the sideslip angle threshold value βδ$_0$ beyond which a downgraded state is reached.

Alternatively, the maximum authorized sideslip angle βmax is below the threshold value, for example between the threshold value βT$_0$ and 90%*βT$_0$.

The database of maximum sideslip angles thus includes, for each runway state, at least one maximum authorized sideslip angle value βδmax of the nose gear wheel 5 and at least one maximum authorized sideslip angle value βTmax of the left 7a and right 7b main landing gears.

Preferably, as described above, the limiting module 58 is configured to estimate or receive a parameter representative of a current adhesion state of the runway and to extract, from the database, the maximum authorized sideslip angle(s) βδmax and/or βTmax as a function of said parameter.

According to one alternative, the limiting module 58 is configured to estimate one or more maximum authorized sideslip angle(s) βδmax and/or βTmax independently of the runway adhesion state.

The limiting module 58 is further configured to determine, as a function of information relative to the current speed of the aircraft, the maximum authorized sideslip angle βδmax of the nose gear wheel 5, and the maximum authorized sideslip angle βTmax of the left 7a and right 7b main landing gears, the steering angle range [δdir$_{min}$; δdir$_{max}$] of the nose gear wheel 5.

The steering angle range [δdir$_{min}$; δdir$_{max}$] of the nose gear wheel 5 is determined such that, when the steering angle of the nose gear wheel 5 is within said steering angle range, the sideslip angle βδ of the nose gear wheel 5 is lower, in absolute value, than the maximum sideslip angle βδmax.

The steering angle range [δdir$_{min}$; δdir$_{max}$] of the nose gear wheel 5 is for example determined from a simplified model, called "bicycle model", in which the left 7a and right 7b main landing gears are likened to a virtual landing gear located in the longitudinal plane of symmetry of the aircraft 1, the nose gear wheel 5 retaining its steerable wheel role.

According to this model, the steering angle δdir of the wheel 5, the current sideslip angle βδ of the wheel 5 and the current sideslip angle βT of the main landing gear 7 are linked by the following relationship:

$$\tan(\delta dir + \beta\delta) = \tan(\beta T) + \frac{d}{|V_s| \cdot \cos(\beta T)} \cdot r,$$

Where d is the distance along a longitudinal axis between the nose gear wheel 5 and the main landing gear 7.

The steering angle δdir may then be expressed as:

$$\delta dir = a\tan\left(\tan(\beta T) + \frac{d}{|V_s| \cdot \cos(\beta T)} \cdot r\right) - \beta\delta.$$

Assuming that βδ and βT are small, the sideslip angle β may be expressed approximately as:

$$\delta dir \approx a\tan\left(\beta T + \frac{d}{|V_s|} \cdot r\right) - \beta\delta.$$

The lower $\delta dir_{min}$ and upper $\delta dir_{max}$ bounds of the steering angle range $[\delta dir_{min}; \delta dir_{max}]$ of the nose gear wheel 5 are thus determined according to the following expressions:

$$\delta dir_{min} = a\tan\left(\frac{d}{|V_s|} \cdot r - \beta T_{max}\right) - \beta\delta_{max}$$

$$\delta dir_{max} = a\tan\left(\frac{d}{|V_s|} \cdot r + \beta T_{max}\right) + \beta\delta_{max}.$$

Preferably, the steering angle range $[\delta dir_{min}; \delta dir_{max}]$ of the nose gear wheel 5 is further determined such that, when the steering angle δdir of the nose gear wheel 5 is within said steering angle range, the sideslip angle βT of the left 7a and right 7b main landing gears is lower, in absolute value, than the maximum sideslip angle βTmax.

The regulating assembly 60 is configured to determine an activation threshold of the differential braking assembly 27'.

This activation threshold corresponds to a threshold value of the lateral trajectory parameter, in particular a curve radius threshold value $\rho_{seuil}$ or a yaw speed threshold value $r_{seuil}$.

This activation threshold in particular corresponds to a threshold value of a lateral trajectory parameter beyond which the differential braking assembly 27' is activated.

For example, this threshold value corresponds to a curve radius threshold value $\rho_{seuil}$ below which the differential braking assembly 27' is activated, or a yaw speed threshold value $r_{seuil}$ above which the differential braking assembly 27' is activated.

Hereinafter, "activation threshold" will refer to this threshold value, and it will be considered that a lowering of this threshold corresponds to a relaxation of the criteria necessary for activation of the differential braking assembly 27'. A lowering of the threshold therefore for example corresponds to an increase of the curve radius threshold value $\rho_{seuil}$ or to a decrease of the yaw speed threshold value $r_{seuil}$.

The regulating module 60 is preferably configured to determine the activation threshold based on parameters relative to the movement of the aircraft on the ground, in particular:

information relative to the current speed of the aircraft 1, in particular the modulus $|V_S|$ of the current ground speed vector of the aircraft, and/or environmental parameters, in particular the estimated or presumed current runway state (dry, wet or icy runway), and/or operating parameters of the aircraft 1, in particular an operating state of the nose gear wheel 5 and the temperature of the braking devices 27a, 27b.

The regulating module 60 is able to receive said parameters from the determining assembly 35.

In particular, the regulating module 60 is configured to determine the activation threshold based on current speed information of the aircraft.

The regulating module 60 is also configured to determine the activation threshold based on the temperature of the braking devices 27a, 27b. Indeed, a high temperature leads to raising the activation threshold, to prevent an increase in the temperature of said braking devices 27a, 27b as much as possible, which could cause a deterioration of the latter.

The regulating module 60 is further configured to determine the activation threshold based on the operating state of the nose gear wheel 5.

In particular, in case of failure or malfunction of the nose gear wheel 5, the latter not being steerable, and freely rotating, the activation threshold is lowered so as to make it possible to follow the desired trajectory despite the malfunction of the nose gear wheel 5.

Preferably, the regulating module 60 is also configured to determine the activation threshold based on the steering angle range $[\delta dir_{min}; \delta dir_{max}]$ of the nose gear wheel 5.

In particular, the regulating module 60 is configured to receive said steering angle range $[\delta dir_{min}; \delta dir_{max}]$ from the limiting module 58.

A reduction of this range $[\delta dir_{min}; \delta dir_{max}]$ generally leads to lowering the activation threshold.

In particular, the activation threshold is determined such that any value of the considered trajectory parameter, below the threshold value of said parameter (i.e., any curve radius greater than the curve radius threshold value $\rho_{seuil}$, and/or any yaw speed below the yaw speed threshold value $r_{seuil}$), may be reached by the aircraft without using the differential braking assembly 27', and while keeping a steering angle of the nose gear wheel 5 within the steering angle range $[\delta dir_{min}; \delta dir_{max}]$.

Thus, a decrease, in absolute value, of the lower $\delta dir_{min}$ or upper $\delta dir_{max}$ bound of the steering angle range leads to lowering the threshold value of the trajectory parameter beyond which the activation of the differential braking assembly 27' is necessary.

The module 62 for determining trajectories of the aircraft 1 is configured to determine, at each moment or sequentially, i.e., at a plurality of successive moments during the movement of the aircraft 1 on the ground, a current trajectory of the aircraft, and at least one limit trajectory achievable by the aircraft 1 by actuating at least one lateral movement device.

Each of the current and limit trajectories is characterized by a lateral movement direction and at least one lateral trajectory parameter, in particular a curve radius and/or a yaw speed.

To that end, the determining module 62 is capable of receiving, from the determining assembly 35, parameters relative to the movement of the aircraft on the ground, in particular:
current speed information of the aircraft 1,
environmental parameters, in particular the estimated or presumed to current runway state (dry, wet or icy runway),
—operating parameters of the aircraft 1, in particular an operating state of the nose gear wheel 5,
a current setting of the lateral movement devices 13.

The determining module 62 is preferably also configured to receive, from the limiting module 58, at each moment or at a given frequency, the lower $\delta dir_{min}$ and upper $\delta dir_{max}$ bounds of the steering angle range $[dir_{min}; \delta dir_{max}]$ of the nose gear wheel 5.

The determining module 62 is also configured to receive, from the regulating module 60, an activation threshold of the differential braking assembly 27a, in particular a curve radius threshold value $\rho_{seuil}$ or a yaw speed threshold value $r_{seuil}$.

The current trajectory includes a series of waypoints planned for at least one element of the aircraft 1, under unchanged conditions of the lateral movement devices, but also when longitudinal movement devices 11 are not actuated.

"Unchanged conditions of the lateral movement devices 13" means that the settings of these devices remain unchanged relative to their current settings.

In other words, the current trajectory corresponds to the trajectory that would or will be followed by the aircraft 1 on the ground if the lateral movement devices 13a and 13b keep their current settings, in particular with a fixed steering angle of the nose gear wheel 5, a fixed orientation of the rudder 31 and a constant braking by the differential braking assembly 27', and with unchanged outside conditions, in particular wind.

The current trajectory is a trajectory of at least one element of the aircraft 1, such as the nose gear wheel 5, the nose of the aircraft, or the end of a wing of the aircraft, or the tail of the aircraft.

Preferably, the determining module 62 is configured to determine a current trajectory of several elements of the aircraft 1, for example chosen from among the nose gear wheel 5, the nose of the aircraft, the end of the left wing, the end of the right wing and the tail of the aircraft.

The determining module 62 is configured to determine the current trajectory of the aircraft, in particular characterized by the movement direction, the curve radius and/or the associated yaw speed, from the current speed information of the aircraft and the current settings of the lateral movement devices 13, and preferably the runway state and/or operating parameters of the aircraft.

The determining module 62 is for example configured to determine the current trajectory planned over a preset distance or over a preset time interval, between the current determination moment and a time limit, for example equal to 10 s.

The determining module 62 is further configured to determine, at each moment or sequentially, at least one limit trajectory achievable by actuating at least one lateral movement device 13.

Each limit trajectory includes, for each element of the considered aircraft, a series of limit waypoints that may be reached by said element of the aircraft 1, by actuating at least one lateral movement device 13.

Each limit trajectory is for example a limit trajectory achievable by actuating:
only the nose gear wheel 5, or
only the rudder 31, or
only the differential braking assembly 27', or
only the differential motor assembly 23', or
at least two lateral movement devices 13.

Preferably, the determining module 62 is configured to determine at least one first limit trajectory achievable by the aircraft 1 and at least one second limit trajectory achievable by the aircraft 1.

"Limit trajectory" means that any point located beyond said limit trajectory, i.e., not between a longitudinal trajectory and said limit trajectory, cannot be reached by actuating the considered lateral movement device(s) 13 within the authorized actuation limit(s) of said devices, in particular while remaining in the steering angle range $[\delta dir_{min}; \delta dir_{max}]$ of the nose gear wheel 5.

For example, the determining module 62 is configured to determine a first limit trajectory achievable by actuating a first group of lateral movement devices, and a second limit trajectory achievable by actuating a second group of lateral movement devices, separate from the first group. Each group comprises one or several lateral movement devices 13.

According to one preferred embodiment, the first limit trajectory is the limit trajectory achievable by the aircraft 1 by using lateral movement devices of the first assembly 13a, the differential braking assembly 27' being inactive, i.e., not generating any lateral movement. Furthermore, the second trajectory is the limit trajectory achievable by the aircraft 1 by using both the lateral movement devices of the first set 13a and the differential braking assembly 27', the latter therefore being active.

The determining module 62 is thus configured to determine, at each moment or sequentially, at least one first limit trajectory achievable by actuating the devices of the first set 13a of lateral movement devices, the differential braking assembly 27' being inactive.

Preferably, the determining module 62 is configured to determine two first limit trajectories, each corresponding to a respective lateral movement direction.

The determining module 62 is thus able to determine a first limit trajectory oriented in a first direction, in particular to the left, and a first limit trajectory oriented in a second direction, in particular to the right, opposite the first direction.

Each first limit trajectory includes, for each element of the considered aircraft, a series of first limit waypoints that may be reached by said element of the aircraft 1, by actuating at least one lateral movement device of the first set 13a, preferably all of the devices of the first set 13a, the differential braking assembly 27' being inactive.

"Limit trajectory" means that any point located beyond said limit trajectory, i.e., not between a longitudinal trajectory and said limit trajectory, cannot be reached when the differential braking assembly 27' is inactive.

In particular, if in the current state the differential braking assembly 27' is active, the first limit trajectory is a trajectory that would be obtained if the differential braking assembly 27' was inactivated.

Each first limit trajectory is for example a circular trajectory, in particular defined by a movement direction and by a first limit value of a trajectory parameter.

This first limit value is for example a first minimum curve radius $\rho_{min1}$ or a first maximum yaw speed $r_{max1}$.

The determining module 62 is configured to determine the first limit trajectory, in particular the first limit value, from current speed information of the aircraft, the current settings of the lateral movement devices 13, limit settings of the lateral movement devices of the first set 13a, and preferably, the runway state and/or operating parameters of the aircraft 1.

The limit settings of the lateral movement devices of the first set 13a in particular include a limit orientation angle of the rudder 31.

This limit orientation angle for example has an absolute angle value that may not be exceeded by the rudder 31.

Preferably, this limit orientation angle has a preset value, lower than said absolute value.

The limit settings of the lateral movement devices of the first set 13a also include a limit orientation angle $\delta dir_{lim}$ of the nose gear wheel 5 in the considered lateral movement direction.

This limit steering angle is preferably equal to the lower $\delta dir_{min}$ or upper $\delta dir_{max}$ bound, depending on the considered movement direction, of the steering angle range $[\delta dir_{min}; \delta dir_{max}]$.

The first limit trajectory then corresponds to the trajectory it is possible to achieve by modifying the settings of the nose gear wheel 5 and optionally of the other lateral movement devices 13a of the first assembly, while remaining in the steering angle range $[\delta dir_{min}; \delta dir_{max}]$.

The first limit value of the trajectory parameter is then preferably equal to the activation threshold of the differential braking assembly 27', as determined, then sent by the regulating module 60.

In particular, the first limit value of a trajectory parameter for example includes a first minimum curve radius $\rho_{min1}$ equal to the curve radius threshold value $\rho_{seuil}$.

Alternatively or additionally, the first limit value of a trajectory parameter includes a first maximum yaw speed $r_{max1}$ equal to the yaw speed threshold value $r_{seuil}$.

Preferably, the determining module 62 is thus configured to determine the first limit trajectory as a function of the considered lateral movement direction, the activation threshold of the differential braking assembly 27, and at least one piece of current speed information of the aircraft, in particular the modulus of the current ground speed vector.

The module 62 for determining trajectories of the aircraft 1 on the ground is further configured to determine, at each moment or at a plurality of successive moments, at least one second limit trajectory achievable by actuating both the devices of the first set 13a of lateral movement devices and the differential braking assembly 27'.

Preferably, the determining module 62 is configured to determine two second limit trajectories, each corresponding to a respective lateral movement direction.

The determining module 62 is thus able to determine a second limit trajectory oriented in a second direction, in particular to the left, and a first limit trajectory oriented in a second direction, in particular to the right, opposite the first direction.

Each second limit trajectory includes, for each element of the considered aircraft, a series of second waypoints that may be reached by said element of the aircraft 1, by actuating at least one lateral movement device of the first set 13a, preferably all of the devices of the first set 13a, the differential braking assembly 27', the latter being active.

Each second limit trajectory is for example a circular trajectory, defined by a movement direction and by a second limit value of a trajectory parameter.

Said second limit value corresponds to a minimum or maximum value, depending on the considered parameter, of said parameter that it is possible to achieve by using both the lateral movement devices of the first set 13a and those of the second set 13b.

This second limit value is for example a second minimum curve radius $\rho_{min2}$ or a second maximum yaw speed $r_{max2}$.

The determining module 62 is configured to determine each second limit trajectory from:
- the current speed information of the aircraft,
- the current setting of the lateral movement devices 13,
- limit settings of the lateral movement devices of the first set 13a,
- limit settings of the lateral movement devices of the second set 13b,
- and preferably, the runway state and/or operating parameters of the aircraft 1.

As described above, the limit settings of the lateral movement devices of the first set 13a include a limit orientation angle $\delta dir_{lim}$ of the nose gear wheel 5 in the considered lateral movement direction, said limit steering angle preferably being equal to the lower $\delta dir_{min}$ or upper $\delta dir_{max}$ bound, depending on the considered movement direction, of the turning angle range $[\delta dir_{min}; \delta dir_{max}]$.

The second limit trajectory then corresponds to the trajectory it is possible to achieve by modifying the settings of the nose gear wheel 5 and other lateral movement devices 13, while remaining in the steering angle range $[\delta dir_{min}; \delta dir_{max}]$.

The limit settings of the lateral movement devices of the second set 13b for example include a maximum braking force command differential $\Delta Fmax$.

Preferably, the operating parameters of the aircraft 1 including a current temperature of the braking devices 27a, 27b, the determining module 62 is configured to determine the maximum braking force command differential $\Delta Fmax$ from said temperature.

In general, the maximum braking force command differential $\Delta Fmax$ is a decreasing function of the temperature, at least when the temperature is above a predetermined threshold temperature.

The second limit trajectory then corresponds to the trajectory that it is possible to achieve by actuating the differential braking assembly 27' and the other lateral movement devices 13, without risk of damaging the braking devices.

The command assembly 50 is configured to acquire a lateral trajectory order, in particular an instruction lateral trajectory, entered by a pilot.

Alternatively, the command assembly 50 is configured to acquire a lateral trajectory order generated by an automatic pilot.

In the illustrated example, the command assembly 50 thus includes a manual command device 72, able to be actuated by the pilot to enter the lateral trajectory order.

Preferably, the manual command device 72 includes at least one command member movable by an operator between a first position and a second position, a movement of said command member between the first and second position being intended to generate a lateral trajectory order.

The lateral trajectory order acquired by the command assembly 50 then includes a signal representative of a position or movement value of said command member.

Preferably, the manual command device 72 includes a rudder bar able to be actuated by a pilot, from the cockpit.

The rudder bar includes a left pedal, intended to command a movement of the aircraft around the yaw axis in a first direction (in particular to the left), and a right pedal, intended to command a movement of the aircraft around the yaw axis in a second direction (in particular the right) opposite the first direction.

According to one embodiment, the manual command device 72 further includes a member for activating the differential braking assembly 27'.

This member for activating the differential braking assembly can be actuated by the pilot, from the cockpit, between an activated position, authorizing the implementation of the differential braking assembly to generate a lateral movement of the aircraft 1, and a nonactivated position, prohibiting the implementation of the differential braking assembly to generate such a lateral movement.

In the nonactivated position, the braking assembly 27 can be commanded solely to exert, on the left main landing gear 7a and the right main landing gear 7b, a same force FTa=FTb opposing the movement of the left 7a and right 7a main landing gears along the main rolling direction and thus to generate a longitudinal force opposing the longitudinal movement of the aircraft.

The activating member is also configured to generate a signal for activation or non-activation of the differential braking assembly 27'.

Preferably, the member for activating the differential braking assembly 27' is integrated into the rudder bar, as described in more detail below.

Figure 6:
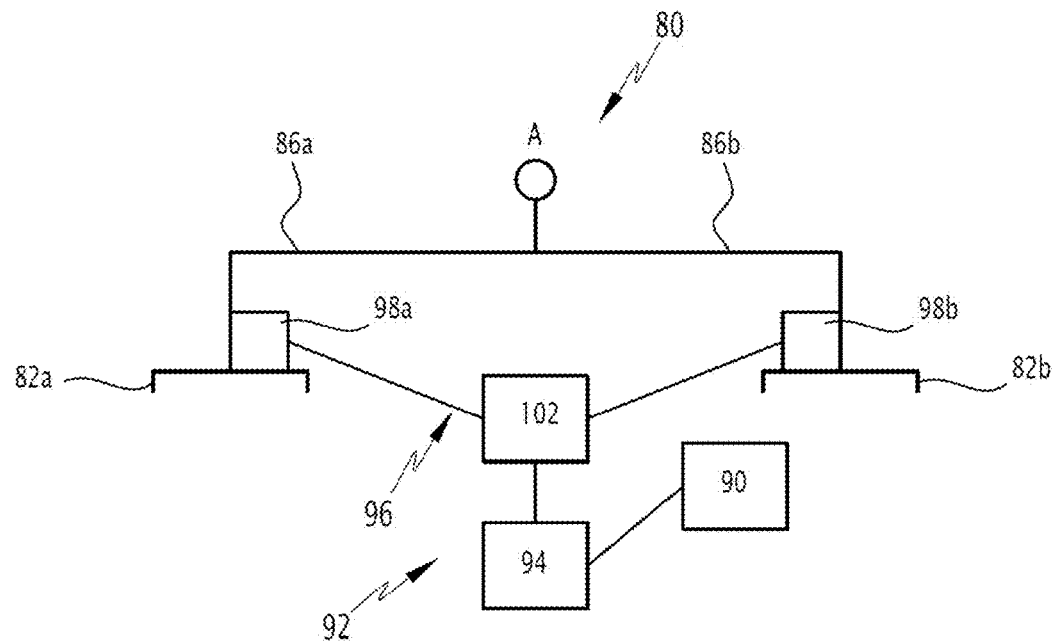
FIG. 6 is a diagram of a manual command device of the control system of FIG. 4, according to one particular embodiment.

FIG. 6 thus shows a manual command device 72 according to one particular embodiment.

Said manual command device 72 includes a rudder bar 80 able to be actuated by a pilot, from the cockpit of the aircraft.

The rudder bar 80 includes a left pedal 82a and a right pedal 82b.

Each of the left 82a and right 82b pedals can be actuated by movement by the pilot in the cockpit.

In particular, an actuation of the left pedal 82a by pressing on said pedal 82a is intended to command a movement of the aircraft around the yaw axis in a first direction, in particular to the left, and an actuation of the right pedal 82b by pressing on said pedal 82b is intended to command a movement of the aircraft around the yaw axis in a second direction opposite the first direction, in particular to the right.

Each of the left 82a and right 82b pedals is movable between a neutral position $p_n$ and an end-of-travel position $p_f$.

Preferably, the end-of-travel position is a stop position, past which the left 82a and right 82b pedals cannot be positioned.

The neutral position $p_n$ of the left pedal 82a, respectively of the right pedal 82b, corresponds to an absence of lateral movement command to the left, respectively to the right.

Preferably, a command play is provided around the neutral position $p_n$, such that a movement of the left and right pedals in close proximity to the neutral position $p_n$ is also associated with an absence of lateral movement command to the left or to the right. This close proximity is for example defined between the neutral position and a given position between the neutral position and the end-of-travel position, for example a position located at Xj % of the total travel between the neutral position and the end-of-travel position. The value Xj % is for example between 1% and 5%, in particular about 3%.

The end-of-travel position $p_f$ of the left pedal 82a, respectively of the right pedal 82b, corresponds to a maximum lateral movement command to the left, respectively to the right.

In particular, the end-of-travel position $p_f$ of the left pedal 82a, respectively of the right pedal 82b, corresponds to a lateral movement command according to the second limit value of a trajectory parameter as determined by the determining module 62, for example the second minimum curve radius $\rho_{min2}$ or the second maximum yaw speed $r_{max2}$.

Each of the left pedals 82a and 82b is movable between a unique preset travel between the neutral position $p_n$ and the end-of-travel position $p_f$.

Unique preset travel means that each point of the pedal is configured to describe a unique journey when the pedal is moved from the neutral position to the intermediate position, to the exclusion of any other journey.

Thus, each point of the pedal, and in general the pedal 82a or 82b, is free to move along a single degree of freedom along the travel.

"Single degree of freedom" means that the position of the pedal in any position over the preset travel is described by a unique variable $p_c$, without the movement of the pedal along the travel being limited to a straight translational movement.

The preset travel of each pedal is for example a movement chosen from among: a translational movement, in particular a straight or circular translational movement, a rotational movement, or a preset combination of said movements.

For example, as illustrated in FIG. 6, each pedal 82a, 82b is mounted on a respective rudder bar 86a, 86b.

For example, each pedal 82a, 82b is mounted fixed on the rudder bar 86a, 86b, and the rudder bar 86a, 86b is mounted rotatably around a rotation axis A, which is a vertical axis in the illustrated example.

Alternatively, this rotation axis is a lateral axis or a longitudinal axis.

Alternatively, each pedal 82a, 82b is mounted movably relative to the rudder bar 86a, 86b, the movement of each pedal 82a, 82b with respect to the rudder bar 86a, 86b being coupled with the rotation of the rudder bar 86a, 86b such that a movement of the pedal 82a, 82b drives a rotational movement of the rudder bar 86a, 86b around its rotation axis.

In one preferred embodiment, each of the left 82a and right 82b pedals is further movable between a rear position $p_a$ and the neutral position $p_n$, the neutral position $p_n$ being between the rear position $p_a$ and the end-of-travel position, in particular midway between the rear position $p_a$ and the end-of-travel position $p_f$.

In this embodiment, the rudder bar 82 includes a mechanism for coupling the movement of the left 82a and right 82b pedals.

This coupling mechanism is configured, when the left 82a or right 82b pedal is moved toward the end-of-travel position $p_f$, to move the right 82b or left 82a pedal, respectively, toward the rear position $p_a$.

For example, this coupling mechanism is configured, when the left 82a or right 82b pedal is moved toward the end-of-travel position $p_f$, to cause a corresponding movement of the right 82b or left 82a pedal, respectively, toward the rear position $p_a$.

In particular, the coupling mechanism is configured to cause a movement of the right pedal 82b, respectively of the left pedal 82a, to the rear position $p_a$, when the left pedal 82a, respectively the right pedal 82b, is moved to the end-of-travel position $p_f$. Each pedal 82a, 82b is preferably movable along a unique preset travel between the rear position $p_a$ and the neutral position $p_n$.

Moving a pedal "to" a position means moving the pedal toward that position, without it necessarily being necessary for this movement to result in moving the pedal "up to" said position.

Thus, at a given moment, only one of the following configurations of the left and right pedals is possible:

the left 82a and right 82b pedals are both located in their respective neutral position $p_n$, such a configuration being associated with an absence of lateral movement command, or the left pedal 82a is positioned between the (strictly) neutral position $p_n$ and the end-of-travel position $p_f$ and as a result, the right pedal 82b is positioned between the neutral position $p_n$ and the rear position $p_a$, such a configuration being associated with a lateral movement command to the left, the right pedal 82b is positioned between the (strictly) neutral position $p_n$ and the end-of-travel position $p_f$ and as a result, the left pedal 82a is positioned between the neutral position $p_n$ and the rear position $p_a$, such a configuration being associated with a lateral movement command to the right.

In the illustrated example, the coupling mechanism includes the rudder bars 86a and 86b, which are secured to one another, or made in one piece.

The rudder bars 86a, 86b are arranged such that rotating one of the bars 86a or 86b around a rotation axis causes an identical rotation of the other bar 86b, 86a. Thus, moving one pedal toward the end-of-travel position $p_f$ is able to cause a corresponding movement of the other pedal toward the rear position $p_a$.

Preferably, each pedal 82a, 82b includes a return mechanism, intended to exert a return force on the pedal 82a, 82b toward the neutral position $p_n$.

The return mechanism is configured to return the pedal 82a, 82b toward the neutral position $p_n$ when no force is exerted by the pilot on the pedal 82a, 82b.

The movement of the left 82a or right 82b pedal is intended to command a movement of the aircraft around the yaw axis by actuating one or several lateral movement devices of the first set 13a, the differential braking assembly 27' being inactive, or by actuating one or several lateral movement devices of the first set 13a and the differential braking assembly 27', based on the current position $p_c$ of the left 82a or right 82b pedal along the travel.

The activation of the differential braking assembly 27' depends on the current position of the left 82a or right 82b pedal, relative to an intermediate position corresponding to an activation position $p_{act}$ of the differential braking assembly 27'.

In particular, a movement of the left 82a or right 82b pedal between the neutral position $p_n$ and the activation position $p_{act}$ along the preset travel is intended to command a movement of the aircraft 1 around the yaw axis $Z_1$-$Z_1$ by actuating one or several lateral movement devices of the first set 13a, the differential braking assembly 27' being inactive.

Such actuation is for example intended to command a movement of the aircraft 1 around the yaw axis $Z_1$-$Z_1$ by actuating the nose gear wheel 5 and/or the rudder 31.

Furthermore, a movement of the left 82a or right 82b pedal along the preset travel from the activation position $p_{act}$ to the end-of-travel position $p_f$ is intended to command a movement of the aircraft 1 around the yaw axis $Z_1$-$Z_1$ by actuating one or several lateral movement devices of the first set 13a, as well as the differential braking assembly 27', the latter being active.

The rudder bar 80 for example includes an acquisition device 90, configured to determine the instantaneous or current positions $p_c$ of the left pedal 82a and the right pedal 82b.

The acquisition device 90 for example includes a left sensor, capable of determining the current position of the left pedal 82a, and a right sensor, capable of determining the current position of the right pedal 82b.

The acquisition device 90 is furthermore configured to send these current positions $p_c$ to the control assembly 52. For example, the acquisition device 90 is able to send the control assembly 52 a signal representative of the current position $p_c$.

The current position $p_c$ of the left 82a or right 82b pedal along the predetermined travel constitutes a given lateral trajectory order.

In particular, this current position $p_c$ is representative of a lateral trajectory instruction parameter, in particular an instruction curve radius or an instruction yaw speed.

As described in more detail below, the control assembly 52 is configured to determine, from said lateral trajectory order, a command order including one or several instruction parameters representative of the instruction lateral trajectory.

The position of the left 82a or right 82b pedal, below or above the activation position, is furthermore associated with a nonactivation or activation order, respectively, of the differential braking assembly 27'.

Furthermore, the rudder bar 80 includes a haptic feedback generator 92, configured to generate a haptic profile on each of the pedals 82a, 82b, so as to have the pilot actuating said pedals feel a threshold crossing corresponding to the crossing of the activation position $p_{act}$ by one of the pedals, toward the end-of-travel position $p_f$.

The haptic feedback generator 92 is in particular configured to apply, to each of the left 82a and right 82b pedals:

a first haptic profile when the left 82a, respectively right 82b, pedal is moved from the neutral position $p_n$ to the activation position $p_{act}$, and a second haptic profile, separate from the first haptic profile, when the left 82a, respectively right 82b, pedal is moved from the activation position $p_{act}$ to the end-of-travel position $p_f$.

For example, the haptic feedback generator 92 is configured to apply, to each pedal 82a, 82b, a force opposing the movement of the pedal 82a, 82b from the neutral position $p_n$ to the end-of-travel position $p_f$. The haptic feedback generator 92 is in particular configured to apply, to each pedal 82a, 82b, a variable force Fh(p), as a function of the current position $p_c$ of the pedal 82a, 82b along the travel.

In particular, the haptic feedback generator 92 is configured to apply, to the left 82a, respectively right 82b, pedal, a force according to a first force profile when the left 82a, respectively right 82b, pedal is moved from the neutral position $p_n$ to the activation position $p_{act}$, and according to a second force profile, separate from the first force profile, when the left 82a, respectively right 82b, pedal is moved from the activation position $p_{act}$ to the end-of-travel position $p_f$.

Preferably, the first drift of the force opposing the actuation of the pedal from the differential braking activation position $p_{act}$ to the end-of-travel position $p_f$ is strictly greater than the first drift of the force opposing the actuation of the pedal to the activation position $p_{act}$.

In other words, the force profile applied by the haptic feedback generator 92 includes a notch at the activation position $p_{act}$.

In the present case, first drift of the force Fh(p) relative to the position p at the activation point $p_{act}$ refers to the first drift on the right.

In particular, the haptic feedback generator 92 is configured to apply a force opposing the actuation of the pedal 82a, 82b past the activation position $p_{act}$ that is greater than any force exerted by the haptic feedback generator 92 in order to oppose the actuation of the pedal 82a, 82b between the neutral position and the activation position.

The application of such a force, generating a hard spot for the movement of the pedal 82a, 82b past the activation position, makes it possible to have the pilot feel the activation position, and thus to notify the pilot that an additional movement of the pedal will result in activating the differential braking assembly 27'.

The rudder bar 80 thus makes it possible to minimize the pilot's workload, the movement of each pedal by a single degree of freedom allowing the command of the lateral movement devices of the first set 13a and the differential braking assembly 27', while retaining the information relative to the activation or non-activation of the differential braking assembly 27'.

The first force profile, applied between the neutral position $p_n$ and the activation position $p_{act}$, is for example such that the force Fh(p) is an increasing function, in particular linear, of the position of the pedal 82a, 82b [sic] the neutral position and the activation position $p_{act}$. The first profile is preferably such that the first drift of the force Fh(p) relative to the position p is below a maximum value denoted $dFh_{max1}$.

The second force profile, applied between the activation position $p_{act}$ and the end-of-travel position $p_f$, for example includes a first portion, applied between the activation position $p_{act}$ and the end-of-travel position $p_f$, or between the activation position $p_{act}$ and a first intermediate position $p_{i1}$. On this first portion, the force Fh(p) is an increasing function of the position of the pedal between the activation position $p_{act}$ and the end-of-travel position $p_f$.

The first drift of the force Fh(p) relative to the position p at the activation point $p_{act}$ is greater than the maximum value $dF_{max1}$.

If applicable, the second force profile includes a second portion, applied between the first intermediate position $p_{i1}$ and the end-of-travel position $p_f$.

On this second portion, the force Fh(p) is for example a decreasing function, or a function decreasing up to a second intermediate position $p_{i2}$, then increasing up to the end-of-travel position $p_f$.

Figure 7:
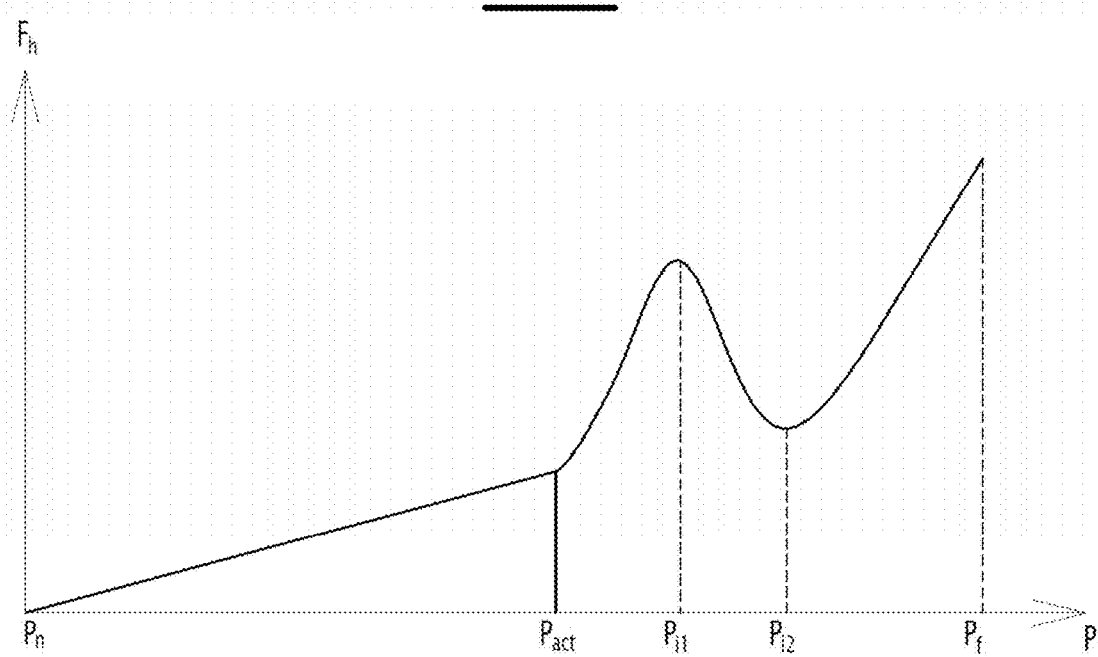
FIG. 7 schematically illustrates a force profile applied by a haptic feedback generator of the system of FIG. 4.

As an example, FIG. 7 illustrates a force profile applied by a haptic feedback generator 92, corresponding to the superposition of a first force profile and a second force profile.

The first force profile, applied from the neutral position $p_n$ up to the activation position $p_{act}$, is such that the force Fh(p) is an increasing linear function of the position, the drift of the force Fh(p) being constant, therefore equal to the maximum value $dFh_{max1}$.

The second force profile includes first and second portions. On the first portion, from the activation position $p_{act}$ up to the first intermediate position $p_{i1}$, the force Fh(p) is an increasing function of the position, the first drift of the force Fh(p) at the activation point $p_{act}$ being greater than the maximum value $dF_{max1}$.

On the second portion, from the first intermediate position $p_{i1}$ up to the end-of-travel position $p_f$, the force Fh(p) is first decreasing up to a second intermediate position $p_{i2}$, then increasing up to the end-of-travel position $p_f$.

It should be noted that in FIG. 7, the value of the force Fh applied in the neutral position $p_n$ is not necessarily nil.

Furthermore, although the force applied between the rear position $p_a$ and the neutral position $p_n$ is not illustrated, a non-nil force is preferably applied between the rear position $p_a$ and the neutral position $p_n$, this force for example being constant.

Preferably, the first and second force profiles are variable profiles, in particular as a function of the activation threshold of the differential braking assembly 27' as determined by the regulating module 60.

Alternatively, the first and second force profiles are preset fixed profiles.

According to one preferred embodiment, the activation position pact is associated with a variable value of a lateral trajectory instruction parameter, in particular an instruction curve radius or a variable instruction yaw speed.

In this embodiment, the activation position $p_{act}$ is in particular associated with the activation threshold of the differential braking assembly 27' as determined by the regulating module 60.

This activation threshold corresponds to a threshold value of the lateral trajectory parameter, in particular a curve radius threshold value $\rho_{seuil}$ or a yaw speed threshold value $r_{seuil}$.

In this embodiment, the activation position pact is for example variable along the travel.

Alternatively, the activation position $p_{act}$ is located in a fixed position along the travel. According to this alternative, each position of the pedals 82a, 82b between the neutral position $p_n$ and the end-of-travel position $p_f$ is associated with a variable lateral trajectory instruction parameter, in particular a variable instruction curve radius or a variable instruction yaw speed.

According to another embodiment, the activation position $p_{act}$ is associated with a fixed value of an instruction parameter, in particular an instruction curve radius or instruction yaw speed fixed value. According to this alternative, the activation position $p_{act}$ is located in a fixed position along the travel.

The haptic feedback generator 92 for example includes a force profile generator 94 and a force generator 96.

The force profile generator 94 is configured to determine the first and second force profiles needing to be applied by the force generator 96.

Preferably, the force profile generator 94 is configured to determine the force profiles as a function of the activation threshold of the differential braking assembly 27' as determined by the regulating module 60.

In particular, from this activation threshold, the profile generator 94 is able to determine the activation position $p_{act}$ along the travel, and to determine the force profiles from said activation position $p_{act}$.

The force generator 96 is able to exert, on each pedal 82a, 82b, a force opposing the movement of the pedal 82a, 82b from the neutral position to the end-of-travel position.

In particular, the force generator 96 is able to exert, on each pedal 82a, 82b, a force according to the force profile determined by the profile generator 94.

Alternatively, the force generator 96 is able to exert, on each pedal 82a, 82b, a force according to fixed force profiles.

The force generator 96 includes at least one actuator, for example a left actuator 98a, capable of exerting a force on the left pedal 82a, and a right actuator 98b, capable of exerting a force on the right pedal 82b.

The actuator 98a, 98b for example comprises a motor.

The force generator 96 preferably includes a sensor capable of determining the instantaneous position of the pedal 82a, 82b.

The sensor is for example a sensor of the acquisition device 90.

The force generator 96 further includes a command unit 102, configured to command the actuator 98a, 98b to apply a force according to the force profiles determined by the profile generator 94.

The command unit 102 is thus configured to command the actuator 98a, 98b to apply a force as a function of the current position of said pedal as determined by the sensor.

In particular, the command unit 102 includes a memory for storing force profiles determined by the profile generator 94.

The command unit 102 is configured to receive, from the sensor at each moment, the current position of the pedals 82a, 82b.

The command unit 102 is further configured to determine the force associated with said current position according to the force profiles, and to command the application of said force by the actuator 98a, 98b.

Preferably, the manual command device 72 includes two rudder bars 80. In particular, the cockpit of the aircraft 1 includes two piloting units, each comprising a rudder bar 80. Preferably, the manual command device 72 further includes a device for coupling the movements of the pedals of the rudder bars, capable, when the left 82a or right 82b pedal of a first rudder bar is moved by a pilot, of causing a corresponding movement of the left 82a or right 28b [sic] pedal of the second rudder bar.

Such coupling makes it possible to simplify the coordination of the actions by the pilots.

The control assembly 52 of the lateral trajectory is configured to control the lateral movement devices 13 such that the aircraft 1 follows the instruction lateral trajectory.

In particular, the control assembly 52 is configured to receive the lateral trajectory order acquired by the command assembly 50.

The control assembly 52 is further configured to convert said lateral trajectory order into a command order, including one or several instruction parameters representative of the instruction lateral trajectory.

The control assembly 52 is also configured to determine, from the instruction parameters, instruction orders to be applied to one or several of the lateral movement devices 13 so that the aircraft follows the instruction lateral trajectory, and to send said instruction orders to the lateral movement devices.

In particular, the control assembly 52 is configured to determine the command orders such that the steering angle of the nose gear wheel 5 remains in the steering angle range of the nose gear wheel [$\delta dir_{min}$; $\delta dir_{max}$], as determined by the limiting module 58.

The control assembly 52 is further configured, if the instruction steering angle does not make it possible to follow the instruction lateral trajectory, to determine instruction orders of one or several lateral movement devices 13 other than the nose gear wheel 5, in particular the rudder 31, the braking assembly 27 of the main landing gear and/or the electric motors 23.

The control assembly 52 is further capable of receiving, from the determining assembly 35, parameters relative to the movement of the aircraft on the ground, in particular:

information relative to the current speed of the aircraft 1, environmental parameters, in particular the estimated or presumed current runway state (dry, wet or icy runway), operating parameters of the aircraft 1, in particular an operating state of the nose gear wheel 5, a current setting of the lateral movement devices 13.

The assembly 52 for controlling the trajectory includes a command module 120 and a control module 130.

The command module 120 is configured to receive the lateral trajectory order, and to convert said lateral trajectory order into a command order, including one or several instruction parameters representative of the instruction lateral trajectory.

Said instruction parameter(s) are in particular representative of the direction of the lateral trajectory and the commanded curve radius and/or yaw speed.

Said instruction parameters for example include an instruction curve radius $\rho_{cons}$ and/or an instruction yaw speed $r_{cons}$, associated with an instruction movement direction around the yaw axis.

These instruction parameters for example also include an activation or non-activation order for the differential braking assembly 27'.

In particular, the command module 120 is configured to receive, from the command device 72, a signal representative of a current position or a movement of the command member.

For example, the command device 72 including a rudder bar 80 according to the embodiment described above, the command module 120 is configured to receive, from the command device 72, in particular from the acquisition device 90, the current positions $p_c$ of the left pedal 82a and the right pedal 82b.

Preferably, the command module 120 is configured to receive, from the force profile generator 94, in particular from the force profile generator 94, the current activation position $p_{act}$.

The command module 120 is configured to determine the instruction parameters as a function of the lateral trajectory order, information relative to the current ground speed of the aircraft, in particular the modulus $|V_S|$ of the ground speed vector, and the runway state.

Preferably, the command module 120 is also configured to determine the activation or non-activation order of the differential braking assembly 27'.

In particular, the command module 120 is configured to determine said activation or non-activation order from the activation or non-activation signal sent by the activation member, and/or as a function of the lateral trajectory order.

According to one embodiment, the manual command device including a rudder bar 80 as described above, the command module 120 is configured to determine the activation or non-activation order from a comparison between the current position $p_c$ of the left 82a and/or right 82b pedal and the activation position $p_{act}$.

The command module 120 is thus configured to:

generate an activation order of the differential braking assembly 27' if the current position $p_c$ of the left pedal 82a or the right pedal 82b is past the activation position $p_{act}$, i.e., between the activation position $p_{act}$ and the end-of-travel position $p_f$;

generate a non-activation order of the differential braking assembly 27' if neither of the current positions $p_c$ of the left 82a and right 82b pedals is past the activation position $p_{act}$.

Alternatively, the command module 120 is configured to determine said activation or non-activation order as a function of the determined instruction trajectory parameter(s).

In particular, the command module 120 is configured to determine the activation or non-activation order from a comparison between the instruction parameter(s) and the corresponding activation threshold(s), as determined, then sent to the regulating module 60.

The command module 120 is thus configured to:

generate an activation order of the differential braking assembly 27' if the instruction parameter exceeds the threshold value of said parameter, in particular if the instruction curve radius $\rho_{cons}$ is below the curve radius threshold value $\rho_{seuil}$ and/or if the instruction yaw speed $r_{cons}$ is above the yaw speed threshold value $r_{seuil}$, generate a non-activation order of the differential braking assembly 27' if the instruction parameter does not exceed the threshold value of said parameter, in particular if the instruction curve radius $\rho_{cons}$ is above the curve radius threshold value $\rho_{seuil}$ and if the instruction yaw speed $r_{cons}$ is below the yaw speed threshold value $r_{seuil}$.

The command module 120 is able to send the control module 130 the trajectory instruction parameter(s).

The control module 130 is configured to determine, from the lateral trajectory order, in particular instruction parameters, instruction orders to be applied to one or several of the lateral movement devices 13 so that the aircraft follows the instruction lateral trajectory.

The control module 130 is further configured to send these instruction orders to the lateral movement devices 13.

The control module 130 is in particular to determine an instruction steering angle $\delta dir_{cons}$, within the steering angle range [$\delta dir_{min}$; $\delta dir_{max}$], the instruction steering angle $\delta dir_{cons}$ being determined such that, when it is applied to the nose gear wheel 5, the aircraft 1 follows or tends toward the instruction lateral trajectory.

In other words, the instruction steering angle $\delta dir_{cons}$ is determined so as to create, when it is applied to the nose gear wheel 5, an effective trajectory of the aircraft including a lateral movement of the aircraft 1 along the given direction and such that the curve radius of said effective trajectory is greater than or equal to the instruction curve radius.

To that end, the control module 130 is preferably configured to determine, as a function of the lateral trajectory command order, an initial steering angle $\delta dir_{ini}$ of the nose gear wheel.

Said initial steering angle $\delta dir_{ini}$ is for example determined so as to create, if it was applied to the nose gear wheel 5, a lateral movement of the aircraft along the instruction lateral trajectory.

The control module 130 is furthermore configured to compare the initial steering angle $\delta dir_{ini}$ to the steering angle range [$\delta dir_{min}$; $\delta dir_{max}$], and to apply a correction to the initial steering angle $\delta dir_{ini}$ if it is not within the steering angle range, to determine the instruction steering angle $\delta dir_{cons}$.

When the initial steering angle $\delta dir_1$ is not within the steering angle range, the instruction steering angle $\delta dir_{cons}$ is for example equal to the lower or upper bound, respectively, of the steering angle range [$\delta dir_{min}$; $\delta dir_{max}$].

The control module 130 is furthermore configured to send a steering instruction to the nose gear wheel 5, in particular to the orientation device 9 of the nose gear wheel 5, in order to orient the nose gear wheel 5 according to the instruction steering angle $\delta dir_{cons}$.

The control module 130 is further configured to determine, if the instruction steering angle $\delta dir_{cons}$ does not make it possible to follow the instruction lateral trajectory, instruction orders of one or several lateral movement devices 13 other than the nose gear wheel 5, in particular the rudder 31, the braking assembly 27 of the main landing gear, the set of electric motors 23 and/or the motors 19.

In particular, the control module 130 is configured to determine an instruction orientation $\delta n_{cons}$ of the rudder 31 and/or an asymmetrical braking instruction $\Delta F_{cons}$ of the differential braking assembly 27', and optionally an operating instruction of the electric motors 23a, 23b and/or of the motors 19, used in differential mode.

Said instruction orientation $\delta n_{cons}$, asymmetrical braking instruction $\Delta F_{cons}$ and/or operating instruction of the motors 23a, 23b and 19 are determined so as to create, when they are applied to the rudder 31, the differential braking assembly 27', the electric motors 23a, 23b and the motors 19, respectively, the steering angle of the nose gear wheel being equal to the instruction steering angle $\delta dir_{cons}$, a lateral movement of the aircraft along the instruction lateral trajectory.

For example, the instruction orientation $\delta n_{cons}$ of the rudder 31, the asymmetrical braking instruction $\Delta F_{cons}$ and the operating instruction of the motors are determined so as to offset the difference between an initial steering angle that would have been necessary to follow the instruction lateral trajectory, and the instruction steering angle, when the latter does not make it possible to follow this trajectory.

The control module 130 is thus preferably configured to determine the instruction orientation $\delta n_{cons}$ and/or the asymmetrical braking orientation $\Delta F_{cons}$ from the difference between the initial steering angle $\delta dir_{ini}$ and the instruction steering angle $\delta dir_{cons}$.

The control module 130 is furthermore configured to send and orientation instruction to the rudder 31, in particular to the orientation device 31 of the rudder, in order to orient the rudder 31 according to the instruction orientation $\delta n_{cons}$.

If applicable, the control module 130 is also configured to send an asymmetrical braking instruction to the differential braking assembly 27', in particular to the control device 29 for the differential braking assembly, in order to apply the asymmetrical braking instruction $\Delta F_{cons}$ to the differential braking assembly 27'.

Preferably, the control module 130 is further configured to send the set 23 of electric motors, in particular the control device 25 of the electric motors, an operating instruction in order to apply the determined operating instruction to the electric motors 23a, 23b.

Preferably, when the command order includes an activation order for the differential braking assembly 27', the control module 130 is configured to determine the instruction orientation $\delta n_{cons}$ of the rudder 31 and the asymmetrical braking instruction $\Delta F_{cons}$ of the differential braking assembly 27', and to send the orientation instruction to the rudder 31 and the asymmetrical braking instruction to the differential braking assembly 27'.

The instruction orientation $\delta n_{cons}$ and the asymmetrical braking instruction $\Delta F_{cons}$ are then determined so as to create, when they are applied to the rudder 31 and to the differential braking assembly 27', respectively, the steering angle of the nose gear wheel 5 being equal to the instruction steering angle, a lateral movement of the aircraft along the instruction lateral trajectory.

Conversely, when the command order includes a non-activation order for the differential braking assembly 27', the control module 130 is configured to determine the instruction orientation of the rudder 31, to the exclusion of the asymmetrical braking instruction of the differential braking assembly 27', and to send the orientation instruction to the rudder 31, without sending the asymmetrical braking instruction to the differential braking assembly 27'.

Preferably, the instruction orientation is then determined so as to create, when it is applied to the rudder 31, the steering angle of the nose gear wheel 5 being equal to the instruction steering angle and the differential braking assembly 27' being inactive, a lateral movement of the aircraft along the instruction lateral trajectory.

Preferably, the control module 130 is further configured to determine the instruction orientation of the rudder 31 based on information relative to the current ground speed of the aircraft.

Indeed, under certain conditions, in particular when the aircraft 1 is rolling at a low speed, the orientation of the rudder has little effect on the lateral trajectory of the aircraft.

In such a case, the control module 130 is for example configured to determine the asymmetrical braking instruction $\Delta F_{cons}$ of the differential braking assembly 37', to the exclusion of the instruction orientation of the rudder 31, and to send the asymmetrical braking instruction to the differential braking assembly 27'.

The asymmetrical braking instruction $\Delta F_{cons}$ is then preferably determined so as to create, when it is applied to the differential braking assembly 27', the steering angle of the nose gear wheel 5 being equal to the instruction steering angle, a lateral movement of the aircraft along the instruction lateral trajectory.

Preferably, the control module 130 is also configured to determine the command orders as a function of an operating state of the nose gear wheel 5, as acquired by the determining assembly 35.

In particular, in case of malfunction of the system for orienting the nose gear wheel 5, the nose gear wheel 5 may be non-steerable, while remaining freely rotating.

In such a case, the control module 130 is configured to determine an instruction orientation of the rudder 31 and/or an asymmetrical braking instruction of the differential braking assembly 27', and optionally an operating instruction of the electric motors 23a, 23b, and/or of the motors 19, used in differential mode. Said instructions are determined so as to create, when they are applied to the rudder 31, the differential braking assembly 27', the electric motors 23a, 23b and/or the motors 19, respectively, a lateral movement of the aircraft along the instruction lateral trajectory.

According to one embodiment, the manual command device including a rudder bar 80 as described above, the control module 130 is configured, selectively, to:
- if none of the current positions $p_c$ of the left and right pedals are between the activation position $p_{act}$ and the end-of-travel position $p_f$, send at least one input instruction to the lateral movement devices of the first set 13a, to the exclusion of the differential braking assembly 27', said input instruction being configured to create, when it is applied to the lateral movement devices of the first set 13a, the differential braking assembly 27' being inactive, a lateral movement of the aircraft 1 according to or tending toward the instruction lateral trajectory,
- if the current position $p_c$ of the left or right pedal is between the activation position $p_{act}$ and the end-of-travel position $p_f$, send input instructions to the lateral movement devices of the first set 13a and the differential braking assembly 27', said input instructions being configured to create, when they are applied to the lateral movement devices of the first set 13a and the differential braking assembly 27', a lateral movement of the aircraft 1 according to or tending toward the instruction lateral trajectory.

Figure 8:
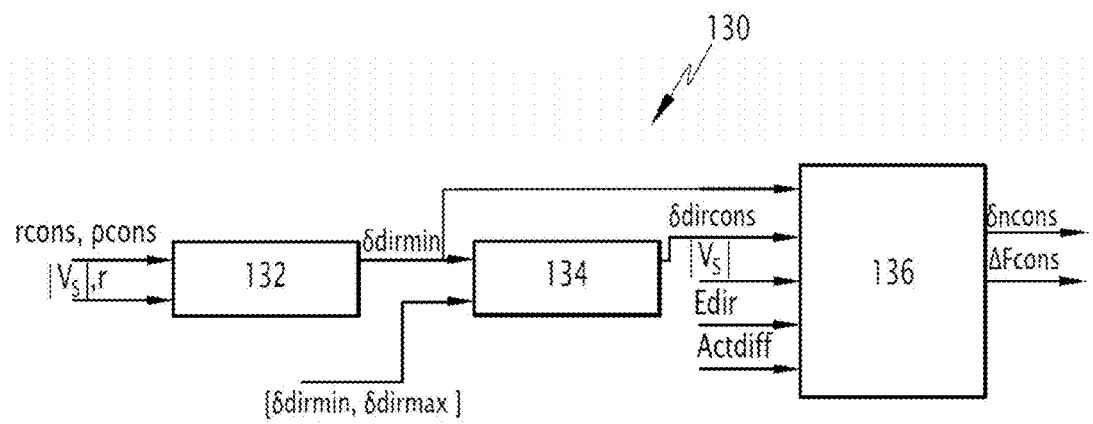
FIG. 8 schematically illustrates a control module of the control system of FIG. 4 according to one particular embodiment of the invention.

FIG. 8 illustrates a control module 130 according to one particular embodiment of the invention.

In this embodiment, the control module 130 includes a sub-module 132 for determining the initial steering angle $\delta dir_{ini}$.

The sub-module 132 is configured to determine the initial steering angle $\delta dir_{ini}$ of the nose gear wheel 5 as a function of the lateral trajectory command order sent by the command module 120, in particular an instruction curve radius $\rho_{cons}$ and/or an instruction yaw speed $r_{cons}$, associated with an instruction movement direction around the yaw axis.

Preferably, the sub-module 132 is configured to determine the initial steering angle $\delta dir_{ini}$ further as a function of at least one piece of information relative to the current speed of the aircraft, in particular as a function of the modulus $|V_S|$ of the current ground speed and the current yaw speed r.

The control module 130 also includes a sub-module 134 for determining the instruction steering angle $\delta dir_{cons}$.

The sub-module 134 is configured to receive, from the limiting module 58, the steering angle range $[\delta dir_{min}; \delta dir_{max}]$ of the nose gear wheel 5.

The sub-module 134 is further configured to receive, from the sub-module 132, the initial steering angle $\delta dir_{ini}$.

The sub-module 134 is configured to compare the initial steering angle $\delta dir_{ini}$ to the steering angle range $[\delta dir_{min}; \delta dir_{max}]$, and to apply a correction to the initial steering angle $\delta dir_{ini}$ if it is not within the steering angle range, to determine the instruction steering angle $\delta dir_{cons}$.

When the initial steering angle $\delta dir_{ini}$ is not within the steering angle range, the instruction steering angle $\delta dir_{cons}$ is for example equal to the upper or lower bound, respectively, of the steering angle range $[\delta dir_{min}; \delta dir_{max}]$.

The control module 130 further includes a sub-module 136 for distributing additional instruction orders.

The distributing sub-module 136 is configured to receive, from the sub-module 132, the initial steering angle $\delta dir_{ini}$.

The distributing sub-module 136 is also configured to receive, from the sub-module 134, the instruction steering angle $\delta dir_{cons}$.

The distributing sub-module 136 is further configured to receive, from the determining assembly 35, information relative to the movement of the aircraft 1, in particular:
at least one piece of current speed information, in particular the modulus $|V_S|$ of the current speed vector of the aircraft 1;
operating parameters of the aircraft 1, in particular an operating state $E_{dir}$ of the nose gear wheel 5.

The distributing sub-module 136 is also configured to receive, from the command module 120, an activation or non-activation order, denoted $Act_{diff}$ in FIG. 8, for the differential braking assembly 27'.

The distributing sub-module 136 is configured to compare the instruction steering angle $\delta dir_{cons}$ to the initial steering angle $\delta dir_{ini}$.

If the instruction steering angle $\delta dir_{cons}$ is smaller, in absolute value, than the initial steering angle $\delta dir_{ini}$, the sub-module 136 is configured to determine instruction orders of one or several lateral movement devices 13 other than the nose gear wheel 5 such that, when these instruction orders are applied, the steering angle of the wheel 5 being equal to the instruction steering angle $\delta dor_{cons}$, the aircraft 1 follows a trajectory according to the instruction lateral trajectory.

The distributing sub-module 136 is configured to determine the instruction orientation $\delta n_{cons}$ and/or the asymmetrical braking orientation from the difference between the initial steering angle $\delta dir_{ini}$ and the instruction steering angle $\delta dir_{cons}$ or an experienced steering angle, when the nose gear wheel 5 is not steerable, if applicable.

In particular, the distributing sub-module 136 is configured to determine the instruction orientation $\delta n_{cons}$ of the rudder 31 as a function of the difference between the initial steering angle $\delta dir_{ini}$ and the instruction steering angle $\delta dir_{cons}$, and as a function of a piece of current speed information of the aircraft, in particular the modulus $|V_S|$ of the current speed vector.

Indeed, the effect of the orientation of the rudder on the lateral trajectory is greater when the modulus $|V_S|$ of the current speed vector is high.

In this embodiment, the orientation of the rudder 31 is intended to compensate, at least partially, the difference between the initial steering angle $\delta dir_{ini}$ and the instruction steering angle $\delta dir_{cons}$.

The distributing sub-module 136 is furthermore configured to send and orientation instruction to the rudder 31, in particular to the orientation device 31 of the rudder, in order to orient the rudder 31 according to the instruction orientation $\delta n_{cons}$.

The distributing sub-module 136 is also configured to determine the asymmetrical braking instruction $\Delta F_{cons}$ as a function of:
- an activation or non-activation order of the differential braking assembly 27',
- the difference between the initial steering angle $\delta dir_{ini}$ and the instruction steering angle $\delta dir_{cons}$,
- a piece of current speed information of the aircraft, in particular the modulus $|V_S|$ of the current speed vector, and
- an operating state of the device for orienting the nose gear wheel 5.

In particular, if the order received from the command module 120 by the distributing sub-module 136 is a non-activation order of the differential braking assembly 27', the sub-module 136 is configured to generate a non-activation instruction intended for the differential braking assembly 27'. This non-activation instruction is intended to provide a nil force differential between the left 27a and right 27b braking devices.

The distributing sub-module 136 is configured to send said non-activation instruction to the differential braking assembly 27'.

If the order received from the command module 120 by the distributing sub-module 136 is an activation order of the differential braking assembly 27', and if there is no malfunction of the device for orienting the nose gear wheel 5, the sub-module 136 is configured to determine the asymmetrical braking instruction $\Delta F_{cons}$ as a function of the difference between the initial steering angle $\delta dir_{ini}$ and the instruction steering angle $\delta dir_{cons}$, current speed information of the aircraft, and preferably the instruction orientation $\delta n_{cons}$.

The distributing sub-module 136 is also configured to send an asymmetrical braking instruction to the differential braking assembly 27', in particular to the control device 29 of the differential braking assembly, in order to apply the asymmetrical braking instruction $\Delta F_{cons}$ to the differential braking assembly 27'.

Furthermore, in case of malfunction of the system for orienting the nose gear wheel 5, the nose gear wheel 5 being non-steerable but free to pivot, the sub-module 136 is configured to determine instruction orders of one or several lateral movement devices 13 other than the nose gear wheel 5 such that, when these instruction orders are applied, the aircraft 1 follows a trajectory according to the instruction lateral trajectory.

Thus, the distributing sub-module 136 is configured to determine an instruction orientation $\delta n_{cons}$ of the rudder 31 and/or an asymmetrical braking instruction of the differential braking assembly 27', and optionally an operating instruction of the electric motors 23a, 23b, used in differential mode.

In particular, the distributing sub-module 136 is configured to determine an instruction orientation $\delta n_{cons}$ of the rudder 31 as a function of the trajectory instruction parameter(s) or the initial steering angle $\delta dir_{ini}$, and a piece of current speed information of the aircraft, in particular the modulus $|V_S|$ of the current speed vector.

Furthermore, if the order received from the command module 120 by the distributing sub-module 136 is an activation order of the differential braking assembly 27', and in case of malfunction of the device for orienting the nose gear wheel 5, the sub-module 136 is configured to determine the asymmetrical braking instruction $\Delta F_{cons}$ as a function of the trajectory instruction parameter(s) or the initial steering angle $\delta dir_{ini}$, current speed information of the aircraft, and preferably, the instruction orientation $\delta n_{cons}$.

The display assembly 54 includes a viewer 140 and a display generating module 142 on the viewer.

The viewer 140 is for example at least partially transparent, such as a semitransparent screen intended to be placed in front of a windshield of the cockpit, a system for projecting images on the windshield of the cockpit, a semitransparent sunshade, a helmet visor, or a semitransparent glass close to the eye.

Alternatively, the viewer is a head down monitor integrated into the dashboard of the cockpit of the aircraft 1.

The generating module 142 includes means for processing graphic information, for example a graphics processor and an associated graphics memory. The graphics processor is suitable for processing graphic information stored in the graphics memory and displaying that information or of a depiction thereof on the viewer 140.

The generating module 142 is configured to display a view of at least a portion of the runway on which the aircraft 1 is rolling on the viewer 140.

This view of the runway portion is for example an egocentric view of the runway portion, i.e., seen from a viewpoint corresponding to the current position of the aircraft 1, for example a viewpoint located in the cockpit of the aircraft 1.

Alternatively, this view is an exocentric depiction of the runway portion, i.e., seen from a virtual camera located at a point other than the current position of the aircraft. In particular, an exocentric image can correspond to an image that would be seen by a virtual camera situated outside the aircraft and viewing the aircraft seen from behind, above and/or from the side.

The runway portion is for example representative of the terrain located in front of the aircraft, near a wing of the aircraft, or around the aircraft.

This view of the runway portion is for example an actual view of the runway portion. Such an actual view can be egocentric or exocentric.

For example, the display assembly 54 includes a camera on board the aircraft, in particular in the nose or at the end of a wing of the aircraft.

Based on data from the images acquired by the camera, the generating module 142 is able to display, on the viewer 140, an actual image of the environment present in front of or around the aircraft. This actual view is then an egocentric depiction.

Alternatively, the display assembly 54 is configured to receive, from a camera outside the aircraft, for example a camera located on the runway, images representative of the runway portion, and to generate the display of an actual image of the environment present in front of or around the aircraft from images received from said camera. This actual view is then generally exocentric.

Alternatively, the viewer 140 being a head-up display, this actual view is for example seen through the windshield of the cockpit.

According to another example, the view of the runway portion is a synthetic depiction of the runway portion.

In particular, the generating module 142 is configured to generate this synthetic depiction from a current position of the aircraft 1 on the runway and a topographical database stored in a memory.

The generating module 142 is for example configured to receive the current position of the aircraft from the determining assembly 35.

The synthetic depiction is for example egocentric. Alternatively, it is exocentric. Such an exocentric depiction for example corresponds to an image that would be seen by a virtual camera situated outside the aircraft and viewing the aircraft.

The generating module 142 is further configured to display a set of curves on the viewer 140 including:

a current trajectory curve, representative of the current trajectory of the aircraft, at least one limit curve representative of a limit trajectory of the aircraft 1.

The current trajectory includes a series of waypoints planned for at least one element of the aircraft 1, under unchanged conditions of the lateral movement devices of the first and second sets 13a, 13b, i.e., in the absence of any modification of the settings of these devices.

Said element(s) are for example chosen from among the nose gear wheel 5, the nose of the aircraft, or the end of a wing of the aircraft, or the tail of the aircraft 1.

The limit trajectory includes a series of limit waypoints that may be reached by said element(s) of the aircraft 1, by actuating at least one lateral movement device 13.

Each limit trajectory is for example a limit trajectory achievable by actuating:
  only the nose gear wheel 5, or
  only the rudder 31, or
  only the differential braking assembly 27', or
  only the differential motor assembly 23', or
  at least two lateral movement devices.

"Limit trajectory" means that any point located beyond said limit trajectory, i.e., not between a longitudinal trajectory and said limit trajectory, cannot be reached by actuating the considered lateral movement device(s) 13.

The generating module 142 is preferably configured to acquire said trajectories from the trajectory determining module 62.

Thus, the limit curve is preferably representative of the limit trajectory as determined by the determining module 62.

The generating module 142 is configured to display said curves on the viewer 140 superimposed on the view of the runway.

Thus, the display of said curves allows the pilot to view, directly on the viewer, the current trajectory and the limit trajectory.

Preferably, the generating module 142 is configured to display at least one first limit trajectory achievable by the aircraft 1 and at least one second limit trajectory achievable by the aircraft 1.

For example, the generating module 142 is configured to display at least one first limit curve representative of a first limit trajectory achievable by actuating a first group of lateral movement devices, and a second limit curve representative of a second limit trajectory achievable by actuating a second group of lateral movement devices, separate from the first group. Each group comprises one or several lateral movement devices 13.

The generating module 142 is thus configured to display a set of curves on the viewer 140 including:

a current trajectory curve, representative of the current trajectory of the aircraft, a first limit curve representative of a first limit trajectory of the aircraft 1, and a second limit curve representative of a second limit trajectory.

The first and second limit curves are preferably representative of the first and second limit trajectories as determined by the determining module 62.

Thus, the display of said curves allows the pilot to view, directly on the viewer, the current trajectory, the first limit trajectory and the second limit trajectory.

Preferably, as described above, the first limit trajectory includes a series of first limit waypoints that may be reached by the considered element(s) of the aircraft 1, by actuating at least one lateral movement device of the first set 13a, the differential braking assembly 27' being inactive.

The second limit trajectory includes a series of second limit waypoints that may be reached by said element(s) of the aircraft 1, by actuating at least one lateral movement device of the first set 13a and the differential braking assembly 27', the latter being active.

The current trajectory curve is representative of the current trajectory over a preset current trajectory display distance Dc.

Each limit curve is representative of the limit trajectory over a preset limit trajectory display distance Dl.

For example, the first limit curve is representative of the first limit trajectory over a first preset limit trajectory display distance Dl1, and the second limit curve is representative of the second limit trajectory over a second preset limit trajectory display distance Dl2.

The current trajectory curve display distance Dc is for example different from the limit trajectory display distances Dl.

The display distances Dl1 and Dl2 of the first and second limit trajectories are for example identical.

Alternatively, the display distances Dl1 and Dl2 are different.

Preferably, the display distances Dc, Dl1 and Dl2 are variable.

Preferably, each display distance Dc, Dl1 and Dl2 is a function of the current speed of the aircraft, in particular the modulus $|V_S|$ of the current ground speed vector of the aircraft.

Figure 9:
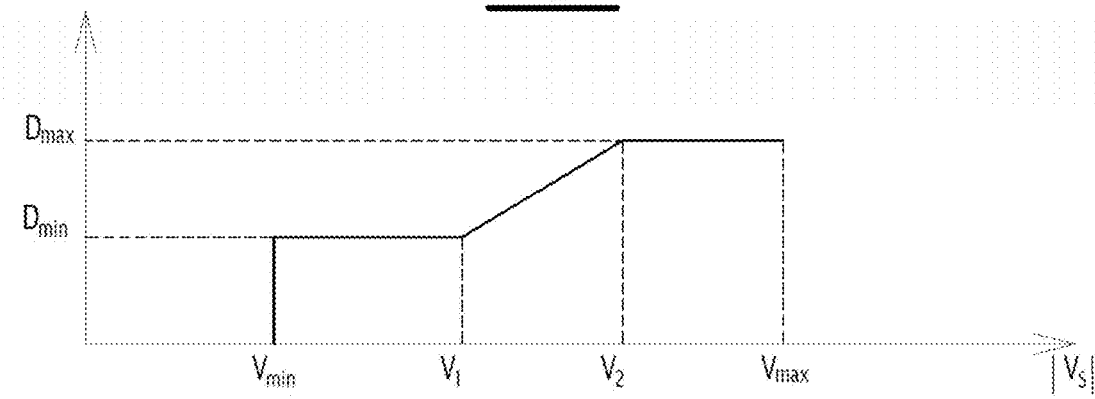
FIGS. 9 and 10 are diagrams illustrating conditions for displaying current and limit trajectory curves on a viewer.

FIG. 9 illustrates, as an example, the display distance Dc, Dl1 or Dl2 (denoted D on the Y axis of FIG. 9), as a function of the modulus $|V_S|$ of the current ground speed vector. In this example, each display distance Dc, Dl1 and Dl2 is an increasing function, in particular linear, of the modulus $|V_S|$ of the current ground speed vector when the modulus $|V_S|$ is within a preset speed range [V1; V2]. In this speed range, each current or limit curve is preferably representative of the current or limit trajectory over a constant duration, independently of the speed.

When the modulus $|V_S|$ of the current ground speed vector is below the threshold V1 or above the threshold V2, the display distance Dc, Dl1, Dl2 is constant, i.e., independent of the speed.

In particular, when the modulus $|V_S|$ of the current ground speed vector is below the threshold V1, respectively above the threshold V2, the display distance Dc, Dl1, Dl2 is equal to a constant distance Dmin, respectively Dmax.

The display generating assembly 142 is configured to determine each display distance Dc, Dl1, Dl2 as a function of the modulus of the current ground speed vector $|V_S|$ of the aircraft 1.

Preferably, as illustrated in FIG. 9, the display generating assembly 142 is configured to display, on the viewer 140, the current trajectory curve, the first limit curve and/or the second limit curve when a speed of the aircraft 1 is between a preset minimum bound $V_{min}$ and maximum bound $V_{max}$ and to eliminate, from the viewer 140, the current trajectory curve, the first limit curve and/or the second limit curve when the speed of the aircraft 1 is below the minimum bound $V_{min}$ or above the maximum bound $V_{max}$.

Eliminating the curves from the viewer 140 makes it possible to avoid overloading the viewer with information that is not very useful under certain circumstances, for example when the aircraft is rolling at a very low speed or high speed during a takeoff phase, the aircraft then generally having a longitudinal trajectory.

Preferably, the generating module 142 is configured to display, on the viewer 140:

a first left limit curve representative of a first left limit trajectory including a yaw movement in the first direction (to the left) and/or a first right limit curve, representative of a first right limit trajectory including a yaw movement in the second direction (to the right), a second left limit curve representative of a second left limit trajectory including a yaw movement in the first direction and/or a second right limit curve, representative of a second right limit trajectory including a yaw movement in the second direction.

Preferably, the generating module 142 is configured to display, selectively on the viewer 140, the first and/or the second limit curve corresponding to a trajectory oriented in the same direction as the current trajectory of the aircraft 1, to the exclusion of the first and/or second limit curve corresponding to a trajectory oriented in the direction opposite the current direction of the trajectory.

"Direction" of a trajectory refers to the direction of the lateral movement of the aircraft around the yaw axis along said trajectory (i.e., according to a positive or negative angle).

Thus, the generating module 142 is configured to display, selectively on the viewer 140:

at least one of the first left limit curve and second left limit curve if the current trajectory is oriented in the first direction, or at least one of the first right limit curve and second right limit curve if the current trajectory is oriented in the second direction.

It will be understood that the selective display of at least one of the first and second left limit curves means that the first and second right limit curves are not displayed.

Likewise, it will be understood that the selective display of at least one of the first and second right limit curves means that the first and second left limit curves are not displayed.

Such a display makes it possible to avoid overloading the viewer 140 with information that is not very useful to the pilot.

According to one preferred embodiment, the generating module 142 is configured to display, selectively on the viewer 140, at least one of the first and second left limit curves, if and only if the current trajectory is oriented in the first direction and one of the following conditions is met:

the yaw angle $\lambda$ of the aircraft 1 being increasing, the current trajectory is such that the yaw angle $\lambda$ is greater than a left display threshold yaw angle $\lambda_a$, or the yaw angle of the aircraft 1 being decreasing, the current trajectory is such that the yaw angle is greater than a left erasure threshold yaw angle $\lambda_e$ (smaller than the left display threshold yaw angle $\lambda_a$).

Likewise, the generating module 142 is configured to display, selectively on the viewer 140, at least one of the first and second right limit curves, if and only if the current trajectory is oriented in the second direction and one of the following conditions is met:

the yaw angle of the aircraft 1 being decreasing (therefore increasing in absolute value), the current trajectory is such that the yaw angle $\lambda$ is less than a right display threshold yaw angle $\lambda_{a'}$, or the yaw angle of the aircraft 1 being increasing (therefore decreasing in absolute value), the current trajectory is such that the yaw angle is less than a right erasure threshold yaw angle $\lambda_{e'}$ (greater than the right display threshold yaw angle $\lambda_{a'}$).

Preferably, the left $\lambda_a$ and right $\lambda_{a'}$ display threshold yaw angles are equal in absolute value, and the left $\lambda_e$ and right $\lambda_{e'}$ erasure threshold yaw angles are equal in absolute value.

Figure 10:
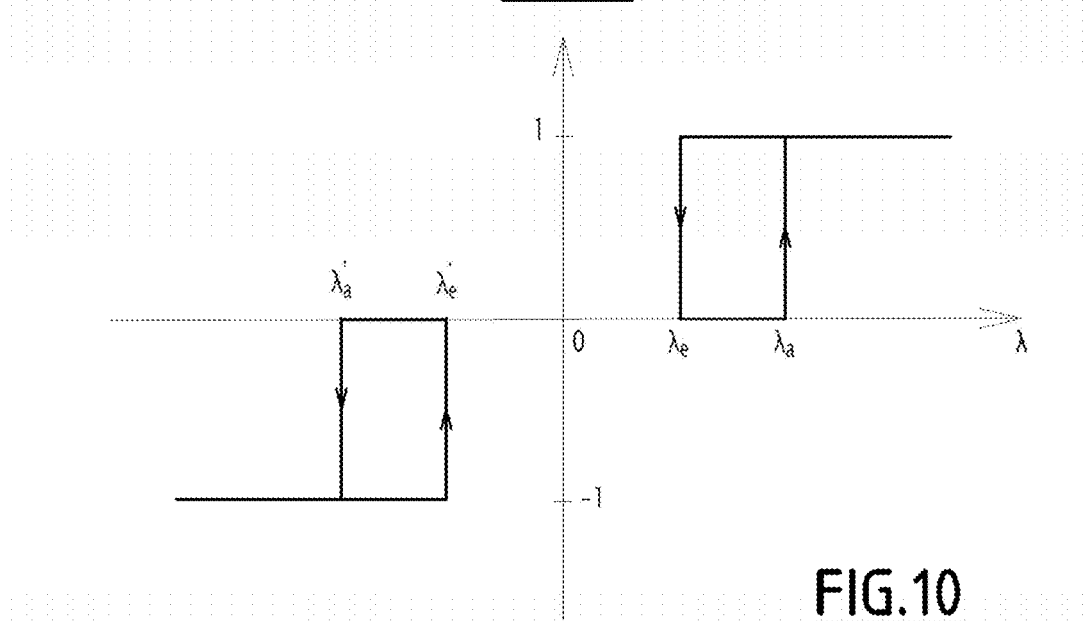

FIG. 10 thus shows a display profile according to one embodiment. In this figure, the values '1' and '-1' on the Y axis correspond to a display by the generating module 142 of the first and/or second left or right limit curves, respectively. The value '0' corresponds to an absence of display of the limit curves.

Such a display with hysteresis makes it possible to avoid a blinking effect by repeated displays and disappearances of the curves when the yaw angle of the aircraft is close to the display threshold yaw angle.

Furthermore, the current trajectory curve is preferably displayed according to a different graphic format from the graphic format of the first and second limit curves.

A graphic format is defined by a set of display parameters, in particular a color, a line type (continuous, dotted, etc.) and/or a line thickness.

In particular, at least one of the display parameters of the graphic format of the current trajectory curve differs from the corresponding parameter of the graphic format of the first limit curve.

Likewise, at least one of the display parameters of the graphic format of the current trajectory curve differs from the corresponding parameter of the graphic format of the second limit curve.

Preferably, at least one of the display parameters of the graphic format of the current trajectory curve differs from the corresponding parameter of the graphic format of the first limit curve and from the corresponding parameter of the graphic format of the second limit curve.

Preferably, the display format of the first limit curve also differs from the display format of the second limit curve.

Such a display allows a more effective identification of the trajectories, in particular a faster identification of the trajectory types associated with the displayed curves.

Preferably, textual indications are further displayed below the current trajectory curve, the first limit curve and/or the second limit curve. These textual indications are indicative of the associated type of curve, in particular current trajectory curve, first or second limit curve, and allow an even faster identification of trajectory types associated with the displayed curves.

Preferably, the generating module 142 is configured to display, on the viewer 140, several curves representative of current trajectories of several elements of the aircraft, several first limit curves representative of first limit trajectories of said elements, and several second limit curves representative of second limit trajectories of said elements.

For example, said elements are the ends of the two wings of the aircraft 1.

In particular, the generating module 142 is configured to display the current trajectory curves, each representative of the current trajectory of one end of a respective wing.

These the current curves define a surface on the runway that will be swept by the aircraft if it follows the current trajectory.

The generating module 142 is also configured to display two first limit curves, each representative of a first limit trajectory of one end of a respective wing, and two second limit curves, each representative of a second limit trajectory of one end of a respective wing.

Such a depiction thus allows the pilot to view and avoid any obstacles that may be located on the runway, along the current trajectory or a targeted trajectory.

Preferably, in this embodiment, the generating module 142 is configured to display only the first and/or the second limit curve of a wing if said limit curves are oriented in the direction associated with the side of the wing.

In particular, the generating module 142 is configured to display only the first and/or the second left limit curve of the left wing and the first and/or the second right limit curve of the right wing.

Preferably, the generating module 142 is configured to display only the first and/or the second limit curve of each wing corresponding to the limit trajectories that are both:
 oriented in the same direction as the current trajectory of the wing, and
 oriented in the direction associated with the side of the wing.

Thus, the generating module 142 is configured to display, selectively on the viewer 140:
 the first and/or the second left limit curve of the end of the left wing if the current trajectory is oriented to the left, or
 the first and/or the second right limit curve of the end of the right wing if the current trajectory is oriented to the right.

FIGS. 11 to 16 show display examples on a viewer.
FIGS. 11 to 16 in particular illustrate a display on a head-up viewer.

Figure 11:
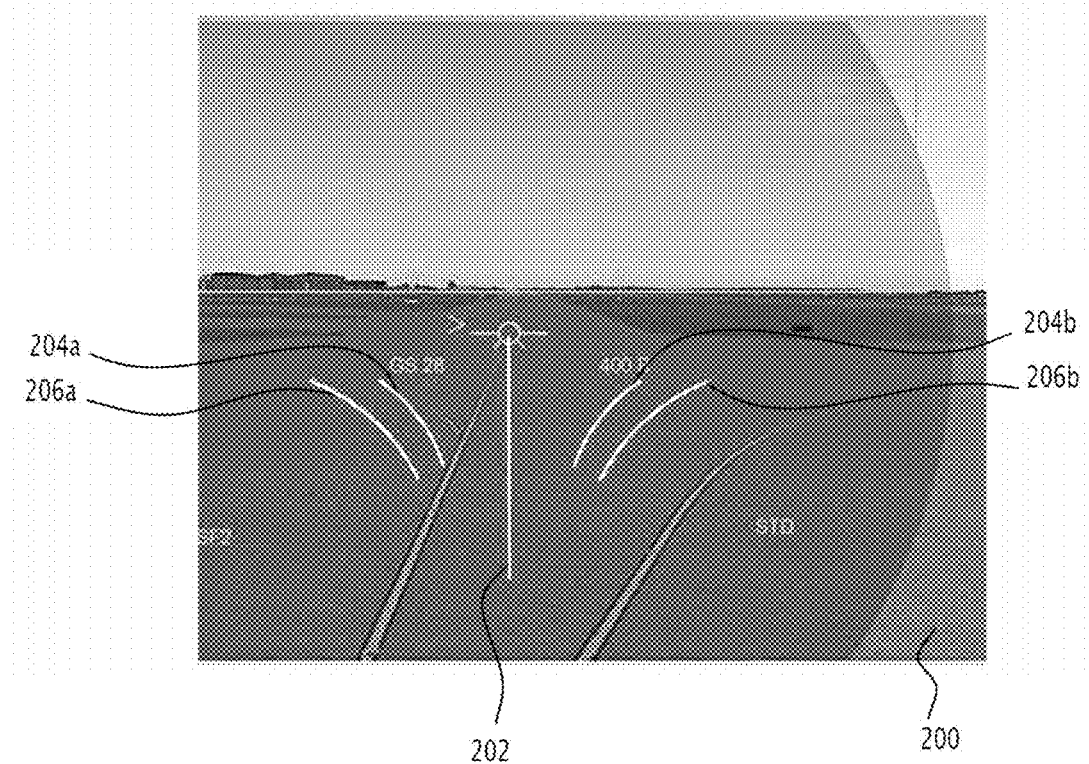
FIGS. 11 to 16 illustrate different modes for depicting trajectory curves on a viewer.

In FIG. 11, the view 200 of the runway portion 3 located in the aircraft 1 is an actual, egocentric view, as seen from the nose of the aircraft.

A current trajectory curve 202, representative of the current trajectory of the aircraft 1, in particular the nose of the aircraft, is superimposed on the view 200.

In this example, the current trajectory is a substantially longitudinal trajectory.

Thus, also superimposed on the view 200 are:
 a first left limit curve 204a and a first right limit curve 204b,
 a second left limit curve 206a and a second right limit curve 206b.

In this example, the current trajectory curve 202, the first limit curves 204a, 204b and the second limit curves 206a, 206b, are displayed in three different graphic formats.

In particular, the current trajectory curve 202 is displayed in the form of a continuous line, the first limit curves 204a, 204b are displayed in the form of a dotted line of a first type, and the second limit curves 206a, 206b are displayed in the form of a dotted line of a second type.

Figure 12:
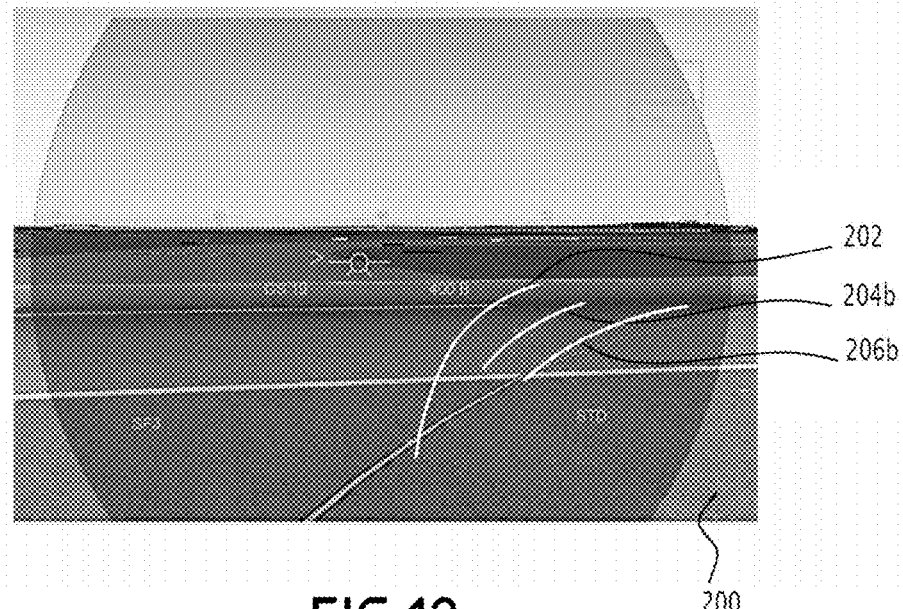

The display example of FIG. 12 differs from the display example of FIG. 11 in that the current trajectory is not a longitudinal trajectory, but a trajectory including a movement of the aircraft around the yaw axis to the right, at a low speed.

In this situation, the first and second left limit curves 204a and 206a are therefore not displayed. Thus, only the first and second right limit curves 204b and 206b are displayed.

Figure 13:
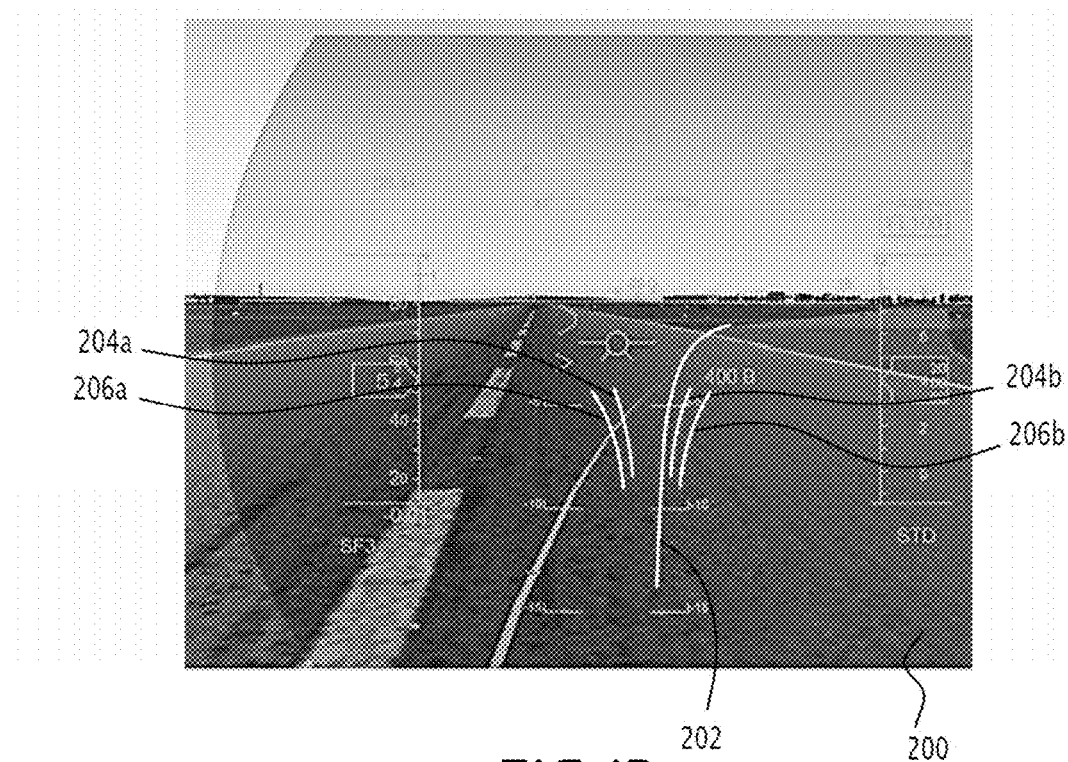

FIG. 13 illustrates a display example similar to FIG. 12, but at a higher speed.

In this situation, the current trajectory includes a movement of the aircraft around the yaw axis to the right.

Nevertheless, due to the higher speed of the aircraft, the curve radius is greater than in the situation of FIG. 12. The first and second left limit curves 204a and 206a are then displayed, as well as the first and second right limit curves 204b and 206b.

Figure 14:
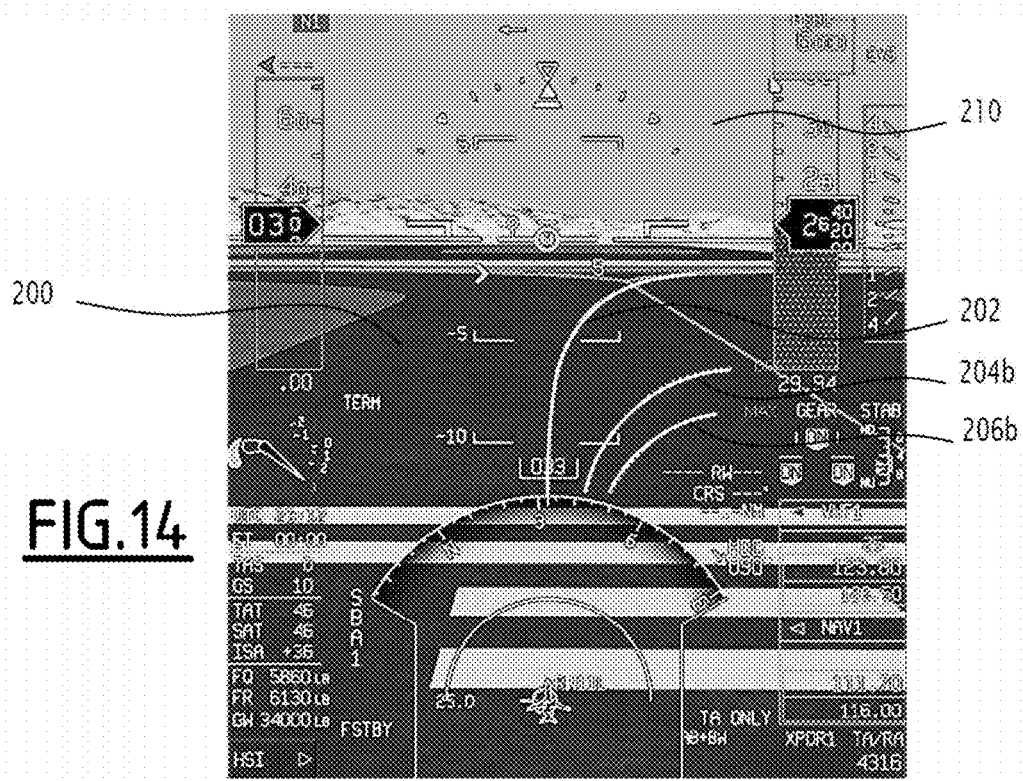
Figure 15:
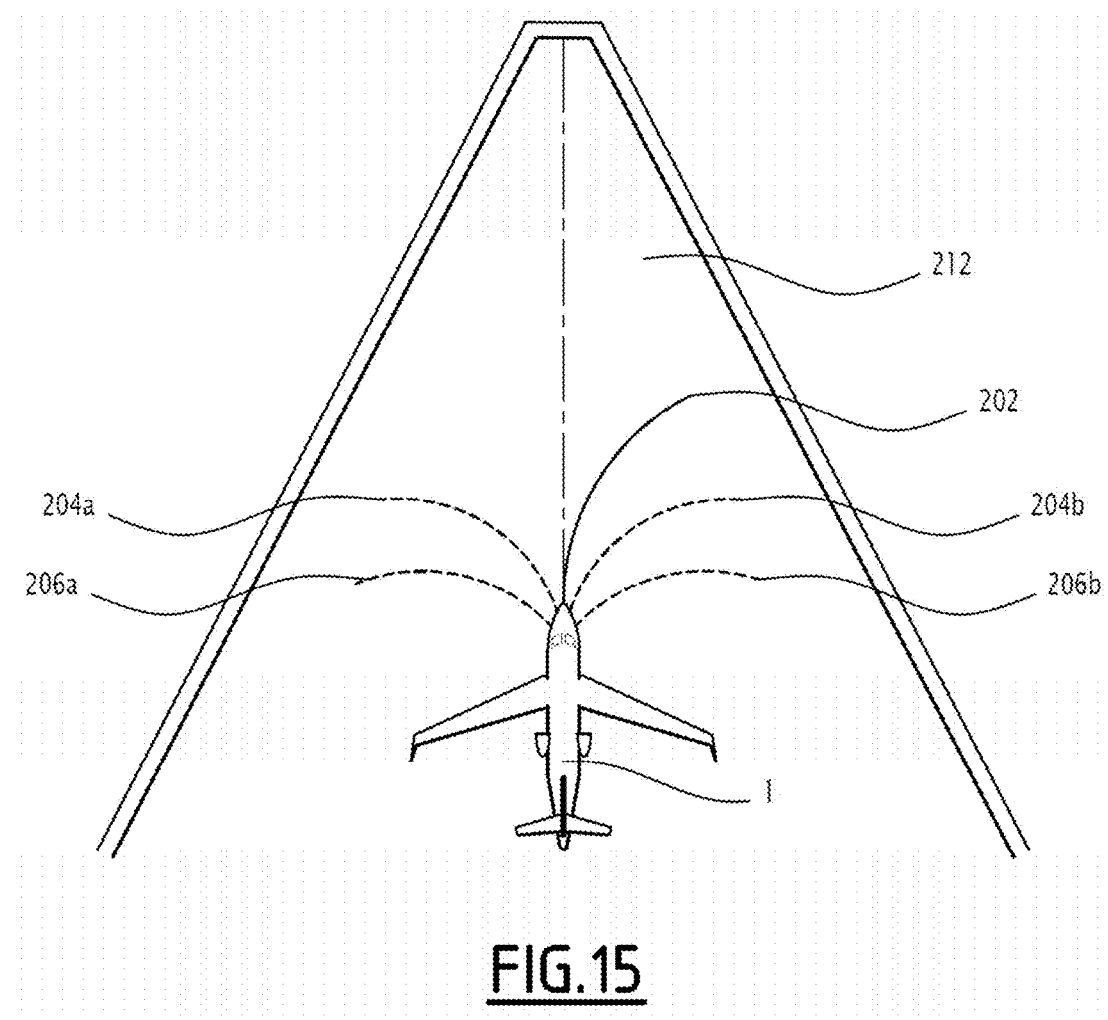
Figure 16:
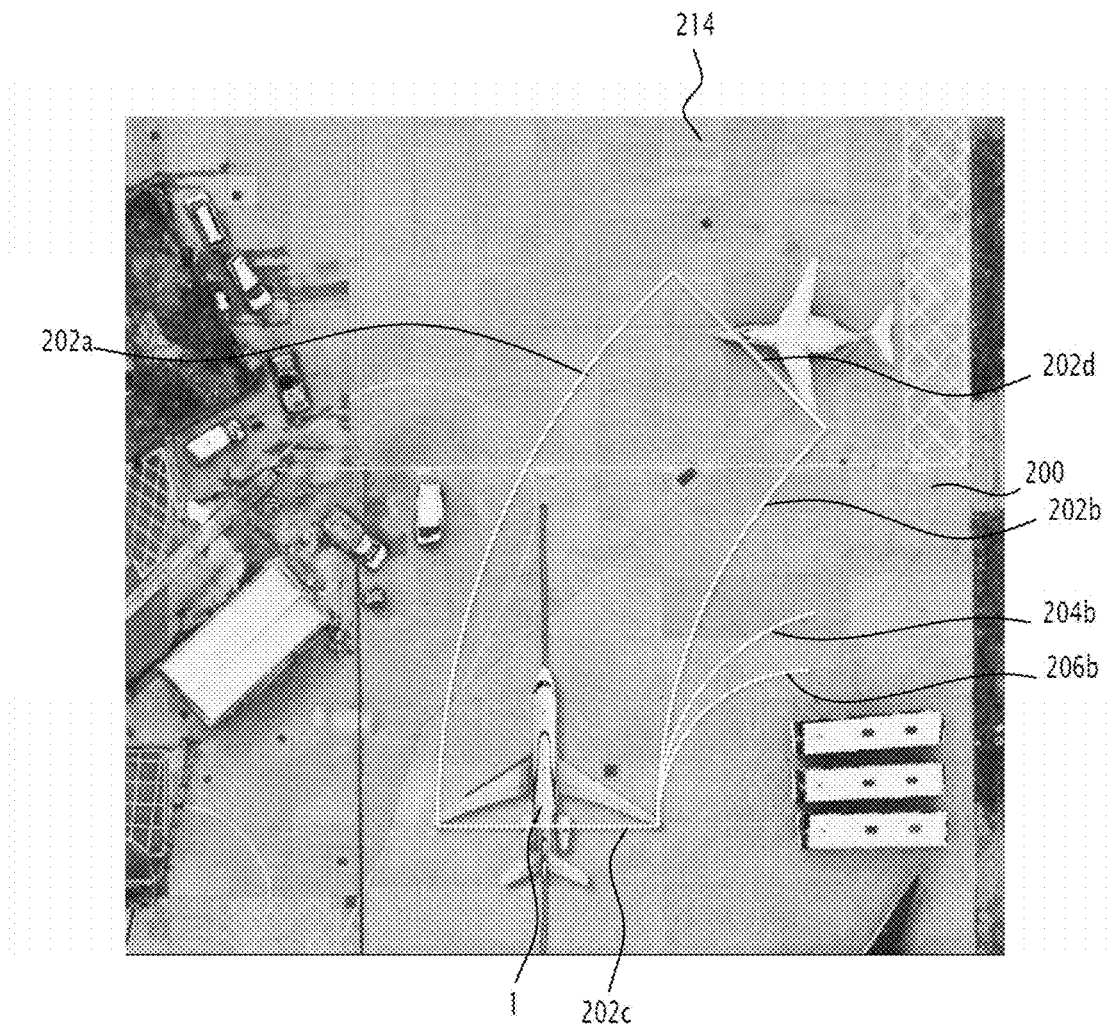

FIGS. 14 to 16 illustrate one embodiment of a head-down viewer.

The embodiment illustrated in FIG. 14 differs from the embodiment illustrated in FIG. 12 in that the view 200 is a synthetic image 210 of the runway portion located in front of the aircraft.

Furthermore, the first and second right limit curves 204b, 206b are displayed in the same graphic format, in particular in the form of a dotted line of a same type.

The embodiment illustrated in FIG. 15 differs from the embodiment illustrated in FIG. 14 in that the view is an exocentric depiction 212, seen from a virtual camera located in front of and behind the aircraft.

Furthermore, in FIG. 15 and in FIG. 13, the current trajectory is not a longitudinal trajectory, but a trajectory including a movement of the aircraft around the yaw axis to the right, and the first and second left limit curves 204a and 206a, as well as the first and second right limit curves 204b, 206b, are displayed.

In the embodiment illustrated in FIG. 16, the view 200 displayed on the viewer is an exocentric depiction 214, seen from at least one actual camera located above the aircraft 1.

In this example, two current trajectory curves 202a and 202b, each representative of the current trajectory of one end of a respective wing, are displayed.

The ends of said curves are connected to one another by two segments 202c, 202d.

The two current trajectories 202a and 202b, as well as the segments 202c, 202d, therefore define a surface on the runway that would be swept by the aircraft if it followed the current trajectory.

In the embodiment illustrated in FIG. 16, the current trajectory includes a movement of the aircraft around the yaw axis to the right. Thus, only the first and second right limit curves 204b, 206b of the right wing are displayed.

According to one embodiment, the control system 40 includes an information processing unit, for example formed by a processor and a memory associated with the processor. The modules for limiting 58, regulating 60, determining trajectories 62, command 120, control 130, and generating 142, and the sub-modules 132, 134 and 136 are then for example each made in the form of software executable by the processor and stored in the memory.

Alternatively, the limiting 58, regulating 60, trajectory determining 62, command 120, control 130, and generating 142 modules, and the sub-modules 132, 134 and 136 are each made in the form of a programmable logic component, such as an FPGA (Field Programmable Gate Array), or in the form of a dedicated integrated circuit, such as an ASIC (Application Specific Integrated Circuit).

Figure 17:
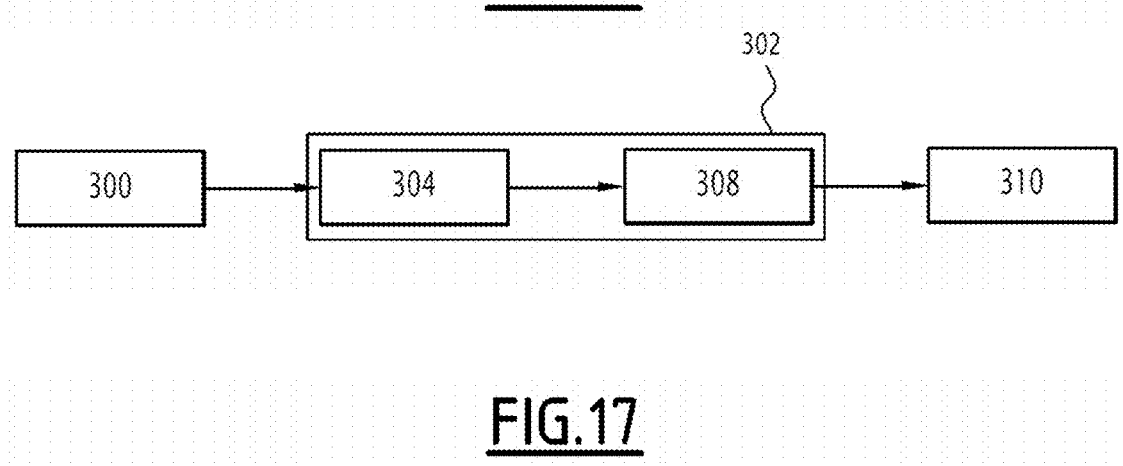
FIG. 17 illustrates a method for controlling a trajectory according to a first aspect.

FIG. 17 shows a block diagram of a method for controlling the lateral trajectory of an aircraft rolling on the ground on a runway, according to a first aspect.

Said method is implemented in an aircraft 1 as described in reference to FIGS. 1 to 3, and preferably using a control system 40.

Said method includes a step 300 for determining a current trajectory of the aircraft 1 on the ground. Said current trajectory includes a series of waypoints planned for at least one element of the aircraft 1, when the lateral movement devices of the first set 13a and the differential braking assembly 27' are not actuated.

The or each element are 1 is for example chosen from among the nose gear wheel 5, a nose of the aircraft, an end of a left wing of the aircraft, an end of a right wing of the aircraft and the tail of the aircraft 1.

The method further includes a step for determining 302 at least one limit trajectory, including a series of limit waypoints that may be reached by the element of the aircraft 1 by actuating at least one lateral movement device 13.

In one preferred embodiment, the step 302 includes a phase 304 for determining at least one first limit trajectory, including a series of first limit waypoints able to be reached by the element of the aircraft 1 by actuating at least one lateral movement device of the first set 13a, the differential braking assembly 27' being in the inactive state.

Preferably, the phase 304 includes determining two first limit trajectories, including a first left limit trajectory associated with a yaw movement in a first direction, and a first right limit trajectory, associated with a yaw movement in a second direction, opposite the first direction.

Preferably, each first limit trajectory is determined as a function of a preset activation threshold of the differential braking assembly 27' and at least one piece of current speed information of the aircraft.

The activation threshold is for example determined as a function of at least one parameter chosen from among the information relative to the current speed of the aircraft 1, a current runway state, an operating state of the nose gear wheel 5 and a temperature of braking devices 27a, 27b of the differential braking assembly 27'.

Said activation threshold is for example determined by a regulating module 60 as described above.

Preferably, as described above, each first limit trajectory corresponds to a trajectory that it is possible to achieve by modifying the settings of the nose gear wheel 5 and optionally of the other lateral movement devices 13a of the first assembly, while remaining in the steering angle range.

This steering angle range is for example determined as a function of information relative to the current speed of the aircraft and the maximum authorized sideslip angle $\beta\delta_{max}$, $\beta T_{max}$, during a step 330 described below.

The step 302 further preferably includes a phase 308 for determining at least one second limit trajectory, including a series of second limit waypoints able to be reached by the element of the aircraft 1 by actuating at least one lateral movement device of the first set 13a and the differential braking assembly 27', the differential braking assembly 27' being active.

Preferably, the phase 308 includes determining two second limit trajectories, including a second left limit trajectory associated with a yaw movement in the first direction, and a second right limit trajectory, associated with a yaw movement in the second direction.

The determining steps 300 and 302 are for example carried out by a trajectory determining module 62 as described above.

The method also includes a step 310 for displaying, on a viewer, for example the viewer 140:

a view of a runway portion 3 located near the aircraft 1;
a current trajectory curve representative of the current trajectory; and
at least one limit curve representative of the limit trajectory,
said curves being superimposed on the view of the portion of the runway.

Said display step 310 is for example carried out by the generating module 142 described above.

The view of the runway portion is for example an egocentric view of the runway portion, seen from a viewpoint located in the cockpit of the aircraft, or an exocentric view of the runway portion, seen from a viewpoint located outside the aircraft.

The view of the runway portion is for example an actual view of the runway portion, or a synthetic depiction of the runway portion, generated from a current position of the aircraft 1 on the runway and a topographical database.

According to one preferred embodiment, the step 310 includes the display on a viewer, for example the viewer 140, of:

the view of a runway portion 3 located near the aircraft 1;
at least a first limit curve representative of the first limit trajectory, and
at least one second limit curve representative of the second limit trajectory, said curves being superimposed on the view of the portion of the runway.

Preferably, step 310 includes the display of a first left limit curve representative of the first left limit trajectory and/or a first right limit curve representative of the first right limit trajectory.

Furthermore, step 310 for example includes the display of a second left limit curve representative of the second left limit trajectory and/or a second right limit curve representative of the second right limit trajectory.

Preferably, if the current trajectory is oriented in the first direction, step 310 includes the display of at least one of the first and second left limit curves, the right limit curves not being displayed.

On the contrary, if the current trajectory is oriented in the second direction, step 310 includes the display of at least one of the first and second right limit curves, the left limit curves not being displayed.

The current trajectory curve, the first limit curve(s) and/or the second limit curve(s) are representative of the current trajectory, the first limit trajectory and/or the second limit trajectory respectively over preset distances, as described above.

Figure 18:
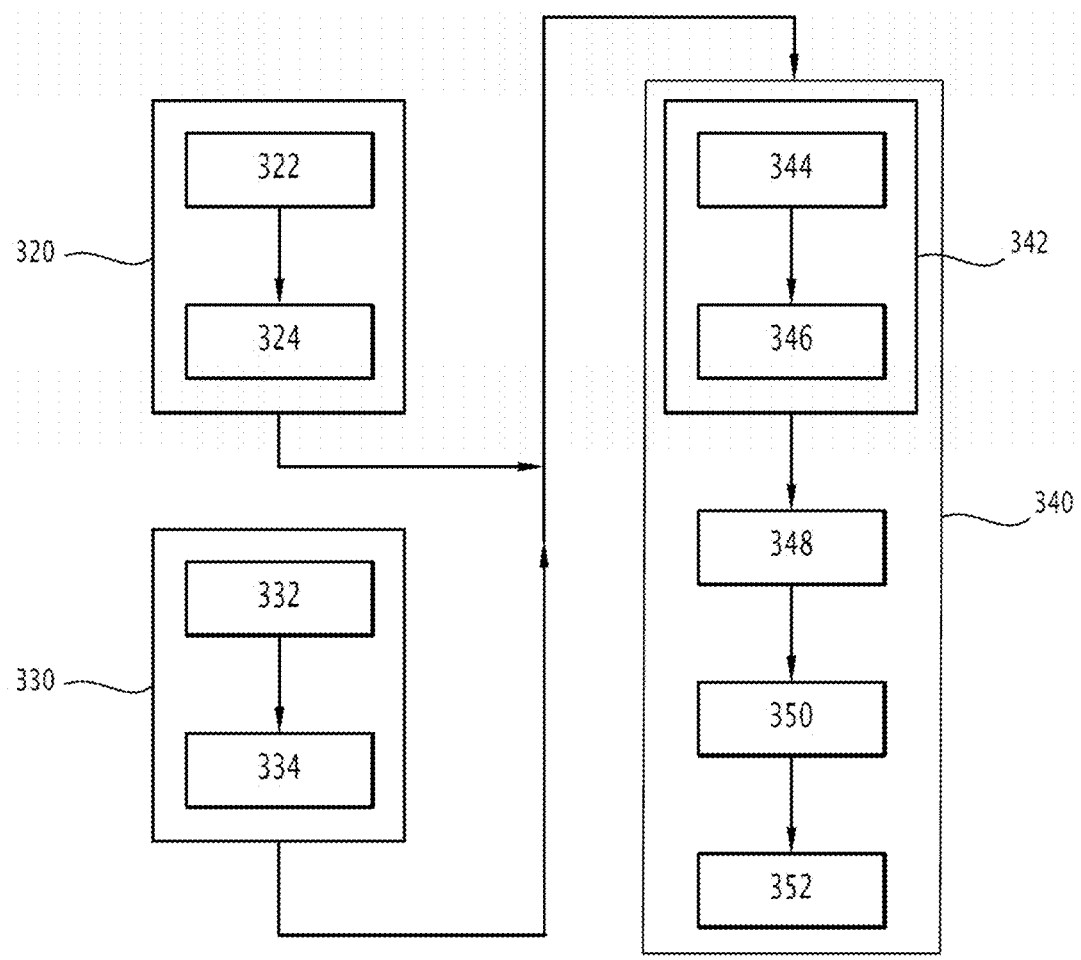
FIG. 18 illustrates a method for controlling a trajectory according to a second aspect.

FIG. 18 illustrates a control method according to a second aspect.

This method is for example carried out after steps 300 to 310 of the method according to the first aspect, or concomitantly with said steps.

Said method includes a step 320 for generating an order commanding an instruction lateral trajectory of the aircraft 1. This instruction lateral trajectory includes a lateral movement of the aircraft 1 in a given direction. Said command order includes at least one instruction parameter representative of the instruction trajectory.

Said generating step 320 for example includes a sub-step 322 for the actuation by a pilot of the command device 72, for example the rudder bar 80 as described above, to generate a lateral trajectory order.

The generating step 320 further includes a sub-step 324 for generating, in particular by the command module 120, the command order from the lateral trajectory order.

Preferably, the command order includes an activation or non-activation order of the differential brake 27'.

For example, the command device including the rudder bar 80, the sub-step for example includes generating an activation order of the differential braking assembly 27' if the current position $p_c$ of the left pedal 82a or the right pedal 82b is between the activation position $p_{act}$ and the end-of-travel position $p_f$, or generating a non-activation order of the differential braking assembly 27' if the current position $p_c$ of the left pedal 82a and the current position of the right pedal 82b are between the neutral position $p_n$ and the activation position $p_{act}$.

The method further includes a step 330 for determining a steering angle range [$\delta dir_{min}$; $\delta dir_{max}$] of the nose gear wheel 5, outside which a risk of loss of adhesion of the nose gear wheel 5 is significantly increased.

This step 330 is for example carried out by the limiting module 58 as described above.

This determining step 330 includes a sub-step 332 for evaluating information relative to a current speed of the aircraft relative to the ground and at least one maximum authorized sideslip angle $\beta\delta_{max}$, $\beta T_{max}$ of the nose gear wheel 5 and/or main landing gear 7a, 7b of the aircraft 1.

The information relative to the current ground speed of the aircraft for example includes the modulus of the current ground speed vector of the aircraft, and the current yaw speed of the aircraft.

The sub-step 332 preferably includes receiving or estimating a parameter representative of an adhesion state of the runway (dry, wet or icy runway, for example), and determining the maximum authorized sideslip angle $\beta\delta_{max}$, $\beta T_{max}$ as a function of said parameter representative of the adhesion state of the runway.

The maximum authorized sideslip angle $\beta\delta_{max}$, $\beta T_{max}$ is for example evaluated from the database.

The determining step 330 further includes a sub-step 334 for determining, as a function of information relative to the current speed of the aircraft and the maximum authorized sideslip angle $\beta\delta_{max}$, $\beta T_{max}$, the steering angle range [$\delta dir_{min}$; $\delta dir_{max}$] of the nose gear wheel 5 such that, when a steering angle $\delta dir$ of the nose gear wheel 5 is within said steering angle range [$\delta dir_{min}$; $\delta dir_{max}$], the steering angle $\beta\delta$, $\beta T$ of the nose gear wheel 5 and/or the main landing gear 7a, 7b is less, in absolute value, than the maximum steering angle $\beta\delta_{max}$, $\beta T_{max}$.

The method further includes a step 340 for controlling the lateral movement devices. The step 340 is for example carried out by the control module 130 as described above.

Said step 340 includes a sub-step 342 for determining, as a function of the command order, an instruction steering angle $\delta dir_{cons}$ of the nose gear wheel 5, within the steering angle range [$\delta dir_{min}$; $\delta dir_{max}$]. Said instruction steering angle $\delta dir_{cons}$ is determined so as to create, when it is applied to the nose gear wheel 5, a lateral movement of the aircraft 1 according to or tending toward said instruction lateral trajectory.

The sub-step 342 for example includes a phase 344 for determining, based on the command order, an initial steering angle $\delta dir_{ini}$ of the nose gear wheel 5, said initial steering angle $\delta dir_{ini}$ being determined so as to create, if it is applied to the nose gear wheel 5, a lateral movement of the aircraft 1 according to or tending toward said instruction lateral trajectory.

The sub-step 342 then further includes a phase 346 for applying a correction to the initial steering angle if said initial steering angle is not within the steering angle range [$\delta dir_{min}$; $\delta dir_{max}$], to determine the instruction steering angle $\delta dir_{cons}$.

Step 340 further includes a sub-step 348 for sending a steering instruction to the nose gear wheel 5 in order to orient the nose gear wheel 5 according to the instruction steering angle $\delta dir_{cons}$.

According to one embodiment, step 340 further includes a sub-step 350 for determining an instruction orientation $\delta n_{cons}$ of the rudder 31 and/or an asymmetrical braking instruction $\Delta F_{cons}$ of the differential braking assembly 27'.

The instruction orientation $\delta n_{cons}$ and/or the asymmetrical braking instruction $\Delta F_{cons}$ are determined so as to create, when they are applied to the rudder 31 and to the differential braking assembly 27', respectively, the steering angle of the nose gear wheel 5 being equal to the instruction steering angle $\delta dir_{cons}$, a lateral movement of the aircraft 1 according to or tending toward said instruction lateral trajectory.

In particular, during the sub-step 350, the instruction orientation $\delta n_{cons}$ and/or the asymmetrical braking orientation $\Delta F_{cons}$ are determined from a difference between the initial steering angle $\delta dir_{ini}$ and the instruction steering angle $\delta dir_{cons}$.

Preferably, the command order generated during step 340 includes an activation or non-activation order of the differential brake 27'.

If said command order includes an activation order, the sub-step 350 includes determining the instruction orientation of the rudder $\delta n_{cons}$ and the asymmetrical braking instruction $\Delta F_{cons}$.

Preferably, the instruction orientation $\delta n_{cons}$ and the asymmetrical braking instruction $\Delta F_{cons}$ are determined so as to create, when they are applied to the rudder and to the differential braking assembly 27', respectively, the steering angle of the nose gear wheel 5 being equal to the instruction steering angle, a lateral movement of the aircraft 1 according to the instruction lateral trajectory.

If said command order includes a non-activation order, the sub-step 350 includes only determining the instruction orientation $\delta n_{cons}$ of the rudder, to the exclusion of the asymmetrical braking instruction $\Delta F_{cons}$.

Preferably, the instruction orientation $\delta n_{cons}$ is then determined so as to create, when it is applied to the rudder, the steering angle of the nose gear wheel 5 being equal to the instruction steering angle and the differential braking assembly 27' being inactive, a lateral movement of the aircraft 1 according to said instruction lateral trajectory.

Step 340 also includes a sub-step 352 for sending the orientation instruction to the rudder 31 in order to orient the rudder 31 according to the instruction orientation $\delta n_{cons}$, and, if applicable, sending an asymmetrical braking instruction to the differential braking assembly 27' in order to apply the asymmetrical braking instruction $\Delta F_{cons}$ to said differential braking assembly 27'.

The control system of the present disclosure thus makes it possible to minimize the risks of loss of adhesion of the aircraft, while helping the pilot control various lateral movement devices.

The control system can be implemented with a command device other than the rudder bar 80 according to the preferred embodiment, for example with traditional command members such as a tiller and a rudder bar movable with two degrees of freedom.

Furthermore, the command system according to the invention may be provided without the display assembly 54.

The embodiments and alternatives described above may further be combined.

What is claimed is:

1. A control system of a trajectory of an aircraft rolling on a runway, the aircraft including lateral movement devices configured to be actuated to change a lateral trajectory of the aircraft, the control system comprising:
   a determining module configured for determining ground trajectories of the aircraft, the determining module being configured to determine, at least at one moment:
      a current trajectory of the aircraft on the ground, including a series of waypoints planned for at least one element of the aircraft, under unchanged conditions of the lateral movement devices,
      at least one limit trajectory, including a series of limit waypoints that can be reached by the element of the aircraft by actuating one considered lateral movement device of the lateral movement devices or a set of considered lateral movement devices of the lateral movement devices, the limit trajectory being such that any point not located between a longitudinal trajectory and the limit trajectory cannot be reached by the element by actuating the considered lateral movement device or the set of considered lateral movement devices; and
   a display assembly comprising:
      a viewer, configured to display a view of a portion of the runway located near the aircraft, and
      a display generating module, configured to display, on the viewer, a current trajectory curve representative of the current trajectory and at least one limit curve representative of the limit trajectory, the current trajectory curve and limit curve being simultaneously superimposed on the view of the portion of the runway.

2. The control system according to claim 1, wherein the lateral movement devices include:
   a first set of lateral movement devices including a steerable nose gear wheel, and
   a differential braking assembly, configured to generate a movement of the aircraft around a yaw axis in an active state, to the exclusion of an inactive state.

3. The control system according to claim 2, wherein the determining module is configured to determine, at the moment:
   at least one first limit trajectory, including a series of first limit waypoints able to be reached by the element of the aircraft by actuating at least one lateral movement device of the first set, the differential braking assembly being in the nonactive state, the first limit trajectory being such that any point not located between the longitudinal trajectory and the first limit trajectory cannot be reached by the element by actuating the at least one lateral movement device of the first set without actuating the differential braking assembly; and/or
   at least one second limit trajectory, including a series of second limit waypoints able to be reached by the element of the aircraft by actuating at least one lateral movement device of the first set and the differential braking assembly, the differential braking assembly being active, the second limit trajectory being such that any point not located between the longitudinal trajectory and the second limit trajectory cannot be reached by the element by actuating the at least one lateral movement device of the first set and the differential braking assembly,
   the display generating module being configured to display, on the viewer:
      at least one first limit curve representative of the first limit trajectory, the first limit curve being superimposed on the view of the portion of the runway, and/or
      at least one second limit curve representative of the second limit trajectory, the second limit curve being superimposed on the view of the portion of the runway.

4. The control system according to claim 3, wherein the determining module is configured to determine:
   two first limit trajectories, including a first left limit trajectory associated with a first left yaw movement in a first direction, and a first right limit trajectory, associated with a first right yaw movement in a second direction, opposite the first direction,
   two second limit trajectories, including a second left limit trajectory associated with a second left yaw movement in the first direction, and a second right limit trajectory, associated with a second right yaw movement in the second direction, and the display generating module is configured to display, on the viewer:
      a first left limit curve representative of the first left limit trajectory and/or a first right limit curve representative of the first right limit trajectory, and
      a second left limit curve representative of the second left limit trajectory and/or a second right limit curve representative of the second right limit trajectory.

5. The control system according to claim 4, wherein the display generating module is configured to display, selectively on the viewer:
   at least one of the first and second left limit curves if the current trajectory is oriented in the first direction, or
   at least one of the first and second right limit curves if the current trajectory is oriented in the second direction.

6. The control system according to claim 4, wherein the display generating module is configured to display, on the viewer, at least one of the first and second left, respectively right, limit curves, if the current trajectory is oriented in the first direction, respectively in the second direction, and if one of the following conditions is met:
   the absolute value of a yaw angle of the aircraft being increasing, the current trajectory is such that the yaw angle is greater in absolute value than a left, respectively right display threshold yaw angle, or
   the absolute value of the yaw angle of the aircraft being decreasing, the current trajectory is such that the yaw angle is greater in absolute value than a left, respectively right erasure threshold yaw angle, the left, respectively right erasure threshold yaw angle being less in absolute value than the left, respectively right display threshold yaw angle.

7. The control system according to claim 2, wherein the limit trajectory is such that any point not located between the longitudinal trajectory and the limit trajectory cannot be reached by the element by actuating the devices of the first set of lateral movement devices and without actuating the differential braking assembly.

8. The control system according to claim 7, wherein the limit trajectory is such that at least some points not located between the longitudinal trajectory and the limit trajectory can be reached by the element by actuating the devices of the first set of lateral movement devices and the differential braking assembly.

9. The control system according to claim 2, wherein the determining module is configured to determine the limit trajectory from current speed information of the aircraft, current settings of the devices of the first set of lateral movement devices and limit settings of the devices of the first set of lateral movement devices.

10. The control system according to claim 9, wherein the limit settings of the devices of the first set of lateral movement devices include a limit orientation angle of the nose gear wheel, the limit orientation angle being such that, when the steering angle of the nose gear wheel is lower, in absolute value, than the limit orientation angle, a sideslip angle of the nose gear wheel is lower, in absolute value, than a maximum authorized sideslip angle.

11. The control system according to claim 1, wherein the current trajectory curve and each limit curve are representative of the current trajectory and each limit trajectory, respectively, over variable preset respective distances, and the display generating module is configured to determine the distances as a function of a current speed information of the aircraft.

12. The control system according to claim 1, wherein the display generating module is configured to display, on the viewer, the current trajectory curve and each limit curve when a speed of the aircraft is between a preset minimum bound and maximum bound, and to eliminate, from the viewer, the current trajectory curve and each limit curve when the speed of the aircraft is below the minimum bound or above the maximum bound.

13. The control system according to claim 1, wherein the element of the aircraft is chosen from among the nose gear wheel, a nose of the aircraft, an end of a left wing of the aircraft, an end of a right wing of the aircraft and a tail of the aircraft.

14. The control system according to claim 1, wherein the viewer includes a head-up viewer of the aircraft, chosen from among a semitransparent monitor intended to be placed in front of the windshield of a cockpit of the aircraft or to be worn by a pilot and a system for projecting images on a windshield of the cockpit, and/or a head-down monitor integrated into a dashboard of the cockpit of the aircraft.

15. The control system according to claim 1, wherein the view of the portion of the runway includes an egocentric view of the portion of the portion of the runway, seen from a viewpoint located in a cockpit of the aircraft, and/or an exocentric view of the portion of the runway, seen from a viewpoint located outside the aircraft.

16. The control system according to claim 1, wherein the view of the portion of the runway is an actual view of the portion of the runway.

17. The control system according to claim 1, wherein the view of the portion of the runway is a synthetic depiction of the portion of the runway, and the display generating module is configured to generate the depiction from a current position of the aircraft on the runway and a topographical database stored in a memory and/or images of the runway entered by a camera.

18. The control system according to claim 1, wherein the determining module is configured to determine the limit trajectory from current speed information of the aircraft, current settings of the lateral movement devices and limit settings of the lateral movement devices.

19. A method of control of a trajectory of an aircraft rolling on a runway, the aircraft including lateral movement devices configured to be actuated to change a lateral trajectory of the aircraft, the method comprising the following steps:
   determining a current trajectory of the aircraft on the ground, the current trajectory including a series of waypoints planned for at least one element of the aircraft, under unchanged conditions of the lateral movement devices;
   determining at least one limit trajectory, including a series of first limit waypoints that may be reached by the element of the aircraft by actuating one considered lateral movement device of the lateral movement devices or a set of considered lateral movement devices of the lateral movement devices, the limit trajectory being such that any point not located between a longitudinal trajectory and the limit trajectory cannot be reached by the element by actuating the considered lateral movement device or the set of considered lateral movement devices;
   displaying, on a viewer, a view of a portion of the runway located near the aircraft; and
   displaying, on a viewer, a current trajectory curve representative of the current trajectory and at least one limit curve representative of the limit trajectory, the curves being superimposed on the view of the portion of the runway.

20. The control method according to claim 19, wherein the lateral movement devices include:
   a first set of lateral movement devices including a steerable nose gear wheel, and
   a differential braking assembly, configured to generate a movement of the aircraft around a yaw axis in an active state, to the exclusion of a nonactive state,
   the determining of the limit trajectory including:
      determining at least a first limit trajectory, including a series of first limit waypoints able to be reached by the element of the aircraft by actuating at least one lateral movement device of the first set, the differential braking assembly being in the nonactive state, the first limit trajectory being such that any point not located between the longitudinal trajectory and the first limit trajectory cannot be reached by the element by actuating the at least one lateral movement device of the first set without actuating the differential braking assembly; and/or
      determining at least one second limit trajectory, including a series of second limit waypoints able to be reached by the element of the aircraft by actuating at least one lateral movement device of the first set and the differential braking assembly, the differential braking assembly being active, the second limit trajectory being such that any point not located between the longitudinal trajectory and the second limit trajectory cannot be reached by the element by actuating the at least one lateral movement device of the first set and the differential braking assembly,
   and the displaying including displaying at least one first limit curve representative of the first limit trajectory, the first limit curve being superimposed on the view of the portion of the runway, and/or at least one second limit curve representative of the second limit trajectory, the second limit curve being superimposed on the view of the second portion of the runway.

* * * * *